(12) United States Patent
Hellenthal et al.

(10) Patent No.: US 7,688,734 B2
(45) Date of Patent: Mar. 30, 2010

(54) SCHEDULING INCOMING PACKET TRAFFIC ON AN OUTPUT LINK OF A NETWORK DEVICE ASSOCIATED WITH A DATA NETWORK

(75) Inventors: Jan Willem Hellenthal, ERmelo (NL); Jean Gerardus Leonardus Jennen, Huizen (NL)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 914 days.

(21) Appl. No.: 11/435,371

(22) Filed: May 16, 2006

(65) Prior Publication Data

US 2007/0121504 A1 May 31, 2007

Related U.S. Application Data

(63) Continuation-in-part of application No. 11/130,045, filed on May 16, 2005, now abandoned.

(51) Int. Cl.
*G01R 31/08* (2006.01)
(52) U.S. Cl. .................. 370/235; 370/231; 370/232; 370/229
(58) Field of Classification Search ......... 370/200–253, 370/272–309, 431–546
See application file for complete search history.

(56) References Cited

U.S. PATENT DOCUMENTS 6,047,000 A * 4/2000 Tsang et al. ............. 370/412

| | | | | |
|---|---|---|---|---|
| 6,594,234 B1 * | 7/2003 | Chard et al. | ............. | 370/236 |
| 2003/0112817 A1 * | 6/2003 | Woo et al. | ............. | 370/413 |
| 2005/0220114 A1 * | 10/2005 | Romano et al. | ......... | 370/395.4 |

OTHER PUBLICATIONS

J. Bennet and H. Zhang, "WF2Q: Worst-case Fair Weighted Fair Queuing", FORE systems.

(Continued)

*Primary Examiner*—Ricky Ngo
*Assistant Examiner*—Iqbal Zaidi
(74) *Attorney, Agent, or Firm*—Williams, Morgan & Amerson, P.C.

(57) ABSTRACT

The present invention provides a method and an apparatus for scheduling a flow on an output link among a plurality of flows of incoming packet traffic at a network device associated with a data network. A scheduler comprises scheduler logic that uses a credit counter per flow to keep track of the service difference received between two or more flows and selects the flow for service next that has the maximum credit value. The scheduler logic updates an amount of credit value in a counter of the next flow with the front-end packet currently being served among the first and second flows with a value that substantially equals a packet size value divided by a flow weight value of the front-end packet currently being served. The scheduler logic further updates an amount of credit value in the first and second counters of the first and second flows having packets waiting with a value that substantially equals the size of the front-end packet currently being served.

7 Claims, 13 Drawing Sheets

OTHER PUBLICATIONS

S. Keshav, "On the Efficient Implementation of Fair Queueing", Journal of Internetworking Research and Experience, 1991.

A. Demers, S. Keshav, and S. Shenker, "Analysis and Simulation of a Fair Queueing Algorithm", ACM, 1989.

Q. Zhao and J. Xu, "On the Computational Complexity of Maintaining GPS Clock in Packet Scheduling", IEEE IINFOCOM, 2004.

M. Shreedhar and G Varghese, "Efficient Fair Queuing Using Deficit Round-Robin", IEEE/ACM Transactions on Networking, vol. 4, No. 3, Jun. 1996.

* cited by examiner

SCHEDULING INCOMING PACKET TRAFFIC ON AN OUTPUT LINK OF A NETWORK DEVICE ASSOCIATED WITH A DATA NETWORK

CROSS-REFERENCE TO RELATED APPLICATION

Pursuant to 35 U.S.C. § 119(e), this application is a continuation-in-part of U.S. patent application Ser. No. 11/130,045, filed on May 16, 2005 now abandoned and entitled, "Scheduling Incoming Packet Traffic on an Output Link of a Network Device Associated with a Data Network."

FIELD OF THE INVENTION

This invention relates generally to telecommunications, and more particularly, to wireless communications.

DESCRIPTION OF THE RELATED ART

Use of different media services, especially content-intensive media services is becoming popular among technology savvy consumers. Despite advances in computing and networking, transport of traffic for many content-intensive media services generally depends upon real-time network performance. Typically, a data network is deployed to transport network traffic associated with a variety of media services, such as interactive services involving interaction between at least two users. Examples of such of interactive services include video and audio conferencing and voice-over-IP (VoIP).

However, an increasing number of interactive services, and other services, impose user demands on the data network usage for transportation of service traffic. These user demands, such as quality-of-service (QoS) requirements, may be expressed in terms of throughput and end-to-end delay. A data network generally comprises a plurality of network devices capable of connecting users across a network coverage area. Many popular data networks normally provide decentralized control, meaning that one or more packet scheduling mechanisms used in the network devices possess certain characteristics to fulfill the QoS requirements of the network as a whole.

In general, a packet scheduling mechanism may resolve contentions over resources, such as bandwidth in a manner that fairly allocates the bandwidth without unnecessary end-to-end delay while maintaining a relatively low complexity. More specifically, for fairness, a scheduler may provide some mechanism to isolate between multiple flows competing for the same output link. That is, each flow is given a fair share of the available bandwidth, even in the presence of misbehaving flows.

To provide relatively short delay in many interactive services, such as video and audio conferencing, a scheduler is expected to limit the total delay experienced by the end users. Since every router may be an element within an end-to-end service delivery chain, such routers are expected to use a scheduler with a low delay. In other words, the scheduler generally decides the order in which packets are sent on the output link and therefore determines the per flow queuing delay. With line rates increasing to 10 gigabit per second and above, a scheduler is expected to have relatively low complexity while being able to operate in very short timeframes, such as nanoseconds.

Fairness and low delay are normally characterized using Generalized Processor Sharing (GPS) as a benchmark. The GPS based approach specifies a theoretical model where all backlogged packet flows are serviced simultaneously, e.g., using a fluid model in a weighted fashion where each weight determines a given minimum bandwidth for a corresponding flow. For example, so-called timestamp schedulers, including weighted fair queuing (WFQ) based schedulers, attempt to approximate the GPS model by calculating the start and finish times of packets according to the GPS model. The start and finish times are the times that a packet should have started and finished service if served by a GPS scheduler Furthermore, to schedule the packets in increasing order of there finish times, an approximation of the GPS model performs a significant number of computations, substantially increasing complexity of the GPS scheduler. Besides this increased computational complexity, the GPS scheduler sorts packets according to their finish times. As a result, the GPS scheduler becomes infeasible for use within network devices that may operate in a high-speed, such as a gigabit range.

Other variations of timestamp scheduling algorithms that approximate the GPS model trade accuracy for lower complexity. However, application of such timestamp scheduling algorithms within high-speed network devices may be difficult for at least some of the reasons set forth with regard to the GPS scheduler. Accordingly, for some high-speed network devices, a type of round-robin scheduling mechanism may sometimes be used. Round-robin schedulers are frame-based schedulers that assign timeslots to flows in some sort of round-robin fashion. Such round-robin schedulers have a relatively a low complexity, but, as a result of a round-robin based scheduling, tend to have poor delay bounds and output burstiness. Nonetheless, one variant of round-robin type of scheduler normally used within high-speed network devices, which is applied in some routers because of their low complexity, is known as Deficit Round Robin (DRR) scheduler.

Within the gigabit speed range, use of many conventional schedulers is either not feasible due to their complexity or in view of undesired characteristics that may not be acceptable when compared with characteristics of a WFQ based scheduler, for example. For instance, a scheduling mechanism, such as a round-robin type scheduling mechanism with low complexity may not provide desired delay bounds within network devices operating in the gigabit speed range, and generally may be difficult to implement due to an unacceptable level of output burstiness.

The present invention is directed to overcoming, or at least reducing, the effects of, one or more of the problems set forth above.

SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the present invention, a method is provided for scheduling a flow on an output link among a plurality of flows of incoming packet traffic at a network device associated with a data network. The method comprises selecting a next flow having a front-end packet to be served from a first flow in a first queue and a second flow in a second queue based on an indication of serving an outgoing packet among a first indication associated with the first flow and a second indication associated with the second flow, updating the first indication associated with the first flow or the second indication associated with the second flow when the front-end packet of the next flow is being served based on an update value associated with a packet size of the front-end packet, and selectively updating the first and second indications and a corresponding indication for the plurality of flows based on the update value for the indication of serving an outgoing packet.

In another embodiment, a scheduler schedules a flow on an output link among a plurality of flows of incoming packet traffic at a network device associated with a data network. The scheduler comprises a scheduling logic to select a next flow having a front-end packet to be served from a first flow in a first queue and a second flow in a second queue based on an indication of serving an outgoing packet among a first indication associated with the first flow and a second indication associated with the second flow, update the first indication associated with the first flow or the second indication associated with the second flow when the front-end packet of the next flow is being served based on an update value associated with a packet size of the front-end packet, and selectively update the first and second indications and a corresponding indication for the plurality of flows based on the update value for the indication of serving an outgoing packet.

In yet another embodiment, a communication system comprises a scheduler for scheduling a flow on an output link among a plurality of flows of incoming packet traffic at a network device associated with a data network. The scheduler includes a scheduling logic similar to the scheduling logic set forth above.

In still another embodiment, an article comprising a computer readable storage medium storing instructions that, when executed cause a scheduler to schedule a flow on an output link among a plurality of flows of incoming packet traffic at a network device associated with a data network in a communication system. The scheduler to select a next flow having a front-end packet to be served from a first flow in a first queue and a second flow in a second queue based on an indication of serving an outgoing packet among a first indication associated with the first flow and a second indication associated with the second flow, update the first indication associated with the first flow or the second indication associated with the second flow when the front-end packet of the next flow is being served based on an update value associated with a packet size of the front-end packet, and selectively update the first and second indications and a corresponding indication for the plurality of flows based on the update value for the indication of serving an outgoing packet.

BRIEF DESCRIPTION OF THE DRAWINGS

The invention may be understood by reference to the following description taken in conjunction with the accompanying drawings, in which like reference numerals identify like elements, and in which.

Figure 1:
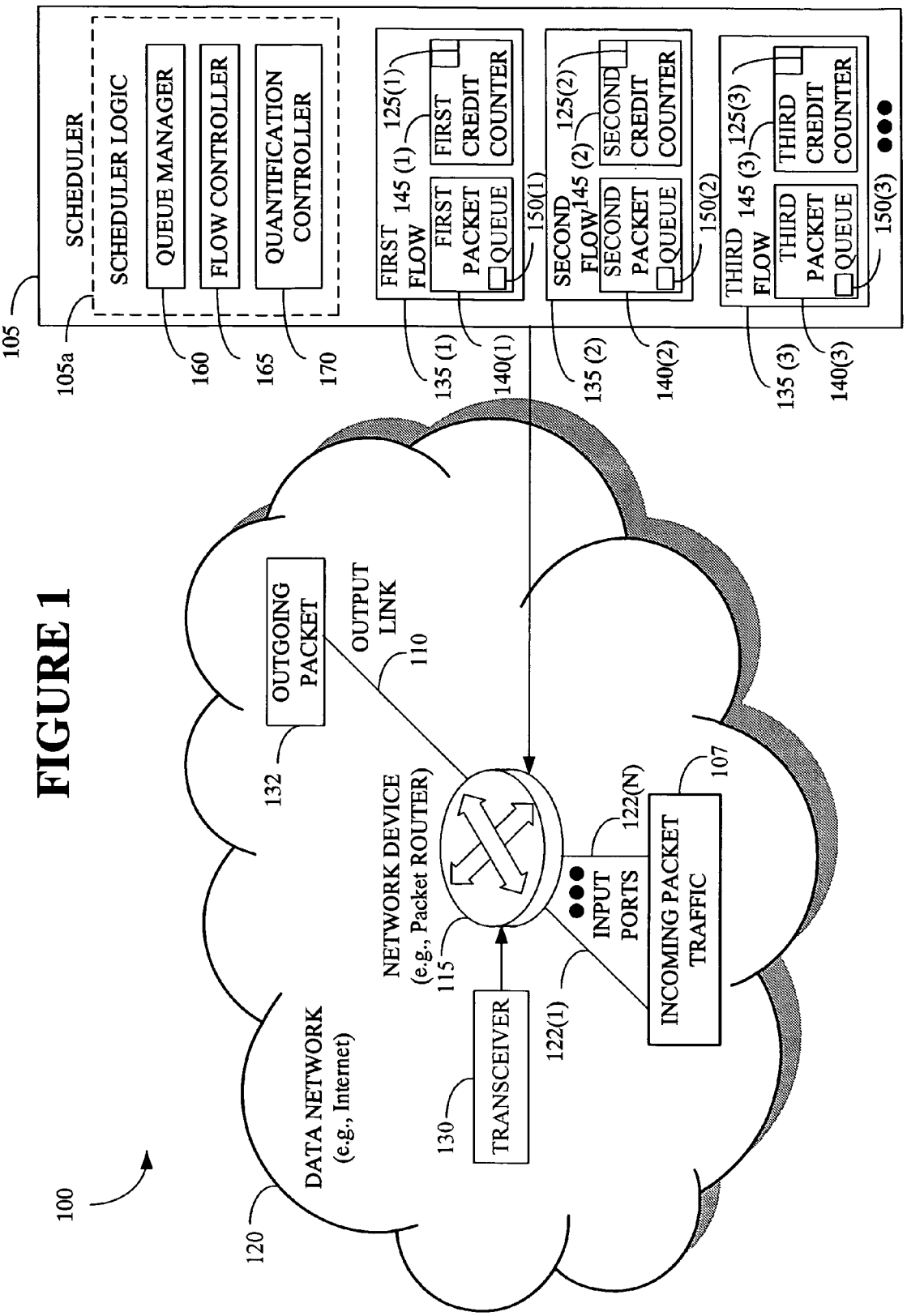
FIG. 1 illustrates a communication system in accordance with one embodiment of the present invention to include a scheduler for scheduling a flow of outgoing packet stream from a plurality of flows of outgoing packet stream in incoming packet traffic on an output link of a network device associated with a data network.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions may be made to achieve the developers' specific goals, such as compliance with system-related and business-related constraints, which will vary from one implementation to another. Moreover, it should be appreciated that such a development effort might be complex and time-consuming, but may nevertheless be a routine undertaking for those of ordinary skill in the art having the benefit of this disclosure.

Generally, a method and apparatus are provided for scheduling a flow from a plurality of flows of outgoing packet stream in incoming packet traffic on an output link of a network device associated with a data network. Based on an update value associated with a packet size of a front-end packet of a next flow of outgoing packet stream is being served, in one embodiment, scheduler logic may update a larger indication among a first and a second indication of serving an outgoing packet on the output link. The scheduler logic selectively updates a corresponding indication of serving an outgoing packet on the output link for a plurality of flows of outgoing packet stream, i.e., including the first and second indications based on the update value, i.e., an amount of the update applied to the larger indication, e.g., a credit value decremented from a credit counter having the maximum value between the first and second credit counters. The scheduler logic decrements the current credit value by the amount of service received based on either the packet size or a ratio of the packet size and a weight value of the front-end packet of the next flow of outgoing packet stream selected for service and is being currently served. In this way, the scheduler logic may provide a fair share of an available bandwidth on the output link to the flows of outgoing packet stream competing for service by the scheduler. To incorporate an ability to specify a minimum guaranteed bandwidth for a specific flow, the scheduler logic selectively updates the corresponding indication of serving an outgoing packet on the output link for the plurality of flows of outgoing packet stream including the first and second indications based on the update value for the larger indication. For example, when the first or the second credit counter is decremented, causing a current credit value to drop below a threshold value, a delta value may be used to update the first, second and third credit counters. For example, regardless of a state of a particular flow, the credit counters of all the flows in the plurality of flows of outgoing packet stream may be updated by the scheduler logic. The scheduler logic implements a scheduling algorithm with characteristics approximating the characteristics of timestamp schedulers like a Weighted Fair Queuing (WFQ) scheduler but without the computational complexity of calculating timestamps and virtual time needed to approximate a Generalized Processor Sharing (GPS) model. Since the scheduler do not use timestamp and virtual time unlike the WFQ scheduler, a relatively reduced calculation complexity of the scheduler logic enables use thereof in high-speed networks devices, such as a packet router. Such an approach to packet scheduling, for example, in delivery of a service, may provide an acceptable QoS in data networks when controlling flow of packets through routing and queuing.

Referring to FIG. 1, a communication system 100 is illustrated in accordance with one embodiment of the present invention to include a scheduler 105 for scheduling a flow 135 of outgoing packet stream from a plurality of flows 135(1-N) of outgoing packet stream in incoming packet traffic 107 on an output link 110 of a network device 115 associated with a data network 120. In one embodiment, the network device 115, for example, a packet router may receive the incoming package traffic 107 on a plurality of input ports 122 (1-N). The incoming packet traffic 107 may be communicated over the data network 120.

Examples of the data network 120 include a packet-based network, such as an asynchronous transfer mode (ATM) network or an Internet Protocol (IP) network. One example of the IP network is the Internet. Of course, other data networks different than the ATM network or the IP network, in which scheduling of a flow of outgoing packet stream is desired may employ the scheduler 105 to select a packet for service from a queue.

To send and/or receive packets of data, the network device 115 may comprise a transceiver 130 capable of conventionally routing packets that the scheduler 105 schedules for transmission on the output link 110. For example, the network device 115, using the scheduler 105 may schedule an outgoing packet 132 for a flow 135 of outgoing packet stream scheduled to be served next.

Examples of the outgoing packet 132 include any packet that may be communicated over the data network 120, such as an ATM packet or an IP packet. In other embodiments, a flow of outgoing packet stream with different data packets than the one comprising the ATM packets or the IP packets may be scheduled for service in the network device 115 without departing from the spirit of the present invention, as appreciated by persons of ordinary skill in the pertinent art.

When scheduling flows, in the network device 115, e.g., a packet router may use a variety of identification schemes to resolve IP addresses for the purposes of routing packets in the IP network. An IP network comprises logical layers from application to physical layers for network elements to provide an end-to-end service for network traffic. The IP network mixes bearer and signaling traffic on a single channel and may be based on an Internet Protocol.

Examples of the Internet Protocol include a version four of the Internet Protocol (IPv4) and a version six (IPv6). The IPv4 uses 32-bit unique addresses that can be allocated as public Internet addresses and is described in IETF RFC 791, published in September, 1981. The IPv6 uses 128-bit address to support up to about $3.4 \times 10^{38}$ public Internet addresses. To assist with router processing, the IPv6 packets include a label that provides a quality of service (QoS) indication for priority applications, such as real-time video and voice. The 128-bit address space of the IPv6 may support many types of devices such as telephones, automobiles, and the like when forming connections on the Internet using a flow identification (ID) in a packet header to identify flows.

In one embodiment, the scheduler 105 may comprise scheduler logic 105a. The scheduler logic 105a may serve the outgoing packet 132 on the output link 110 from the plurality of flows 135(1-N) that include a first flow 135 (1), a second flow 135 (2), and a third flow 135 (3) of outgoing packet stream. To select a particular flow to serve from the plurality of flows 135 (1-N), the scheduler logic 105a may maintain a first indication 125 (1) of serving an outgoing packet from the first flow 135 (1) of outgoing packet stream in a first packet queue 140 (1). In addition, the scheduler logic 105a may maintain a second indication 125 (2) of serving an outgoing packet on the output link 110 of the network device 115 from the second flow 135 (2) of outgoing packet stream in a second packet queue 140 (2). Likewise, the third flow 135 (3) of outgoing packet stream in a third packet queue 140 (3) may use a third indication 125 (3) of serving an outgoing packet on the output link 110 for the scheduler logic 105a.

The scheduler logic 105a may use a counter per flow, for example, a first credit counter 145 (1) to keep track of the service received by the first flow 135 (1) of outgoing packet stream based on the first indication 125 (1) of serving an outgoing packet. Likewise, a second credit counter 145 (2) may keep track of service received by the second flow 135 (2) of outgoing packet stream based on the second indication 125 (2). In a similar manner, a third credit counter 145 (3) may be associated with the third flow 135 (3) of outgoing packet stream for the purposes of tracking the service received by the third flow 135 (3) of outgoing packet stream.

Based on an update value associated with a packet size of a front-end packet of a next flow of outgoing packet stream is being served, in one embodiment, the scheduler logic 105a may update the larger indication among the first and second indications 125(1-2) of serving an outgoing packet on the output link 110. That is, the first packet queue 140(1) may include a first front-end packet 150(1) and the second packet queue 140(2) may include a second front-end packet 150(2). In this way, a front-end packet among the first and second front-end packets 150(1-2) may provide the packet size of the next flow of outgoing packet stream associated with the update value.

Accordingly, an update may depend upon the packet size of the first or second front end packets 150(1-2). This update may be applied to an indication of serving an outgoing packet on the output link 110 with a maximum value indicative of the service received by that flow from the first and second indications 125 (1-2). The scheduler logic 105a may selectively update a corresponding indication of serving an outgoing packet on the output link 110 for the plurality of flows 135 (1-3) of outgoing packet stream, i.e., including the first and second indications 125(1-2) based on the update value, i.e., an amount of the update applied to the larger indication, e.g., a credit value decremented from a credit counter 145 having the maximum value between the first and second credit counters 145(1-2).

Consistent with one embodiment of the present invention, the scheduler logic 105a may comprise a queue manager 160, a flow controller 165, and a quantification controller 170. While the queue manager 160 may arrange the first, second, and third packet queues 140(1-3) into first-in first-out (FIFO) queues, on a per flow basis, the flow controller 165 may be responsible for identifying a flow that is up for serving. The packets arriving in the incoming packet traffic 107 at the input ports 122 (1-N) in the network device 115, may be stored in a respective queue that matches a corresponding flow identification (ID). The flow ID may be determined based on a classification according to a quality of service (QoS) indicated for each flow 135 of outgoing packet stream.

More specifically, the flow controller 165 may control output from the first second, and third packet queues 140 (1-3), controlling packet transfer for these queues onto the output link 110 in the communication system 100. The quantification controller 165 may enable the scheduler logic 105a to determine a particular flow that has the largest indication. That is, in one embodiment, a maximum credit value among the plurality of flows 135(1-3) of outgoing packet stream that include packets waiting to be served, i.e., the backlogged packets, may be used.

In one embodiment, the maximum credit value may be determined between the flows 135 of outgoing packet stream that include a packet waiting in their corresponding queues. That is, each flow 135 having a packet in a corresponding queue may be included in the maximum credit value determination by the scheduler logic 105a. For example, to determine the maximum credit value, the scheduler logic 105a may subtract an amount of service value used for sending a front-end packet of a corresponding queue from a current credit value of the corresponding credit counter 145. This amount of service value may indicate the current credit value that correspond to the first, second or third indications 125 (1) of serving an outgoing packet, in some embodiments. The scheduler logic 105a may select a flow being the next flow of outgoing packet stream to be served, for scheduling, as the flow having one or more packets waiting to be served in the corresponding queue packet queue 140 while having the maximum credit value indicated by the largest indication 125.

When the scheduler logic 105a serves the outgoing packet 137 of the selected flow, the scheduler logic 105a may update the corresponding credit counter 145. That is, the update value may be determined by decrementing the current credit value from the credit counter 145 by the amount of service value received based on either the packet size or a ratio of the packet size and a weight value of the front-end packet of the next flow of outgoing packet stream selected for service and is being currently served. In this way, the scheduler logic 105a may provide a fair share of an available bandwidth on the output link 110 to the flows 135 of outgoing packet stream competing for service by the scheduler 105. That is, the scheduler 105 may account for fairness by updating the larger indication among the first and second indications 125(1-2).

To incorporate an ability to specify a minimum guaranteed bandwidth for a specific flow, the scheduler logic 105a may selectively update the corresponding indication of serving an outgoing packet on the output link 110 for the plurality of flows 135(1-3) of outgoing packet stream including the first and second indications 125(1-2) based on the update value for the larger indication. For example, when the first or the second credit counter 145(1), 145(2) is decremented, causing a current credit value to drop below a threshold value, a delta value may be used to update the first, second and third credit counters 145(1-3).

In accordance with one illustrative embodiment, the credit counters 145 of all the flows in the plurality of flows 135(1-N) of outgoing packet stream may be updated by the scheduler logic 105a. Regardless of a state of a particular flow, i.e., flows that have packets waiting and the flows that don't have any packets waiting in a corresponding packet queue 140, may be updated by the scheduler logic 105a in case the credit value stored in the credit counter drops below the threshold value after decrementing by an amount of the update value. This amount of the update value may depend upon the packet size of the front-end packet of the next flow that is currently being served.

Consistent with one embodiment, the scheduler logic 105a may be implemented as a scheduling algorithm with characteristics approximating the characteristics of timestamp schedulers like a Weighted Fair Queuing (WFQ) scheduler but without the computational complexity of calculating timestamps and virtual time needed to approximate a Generalized Processor Sharing (GPS) model. This computational complexity generally renders many timestamp schedulers, such as a WFQ scheduler infeasible to implement in a high-speed network device that may capable of operating at speeds of 1 Gbs and above. Since the scheduler 105 do not use timestamp and virtual time unlike the WFQ scheduler, a relatively reduced calculation complexity of the scheduler logic 105a enables use thereof in high-speed networks devices, such as the network device 115.

Often some variation of a round-robin scheduling mechanism is used in high-speed network devices because the complexity of timestamp schedulers makes their use infeasible at speeds of 1 Gbs or above. For example, Deficit Round Robin (DDR) is a well-known implementation of such a round-robin scheme in high-speed network devices due to their simplicity. However, the round-robin schedulers including the DRR tend to have relatively poor delay bound and jitter characteristics.

A scheduling algorithm based on the scheduler logic 105a combines the fairness and delay properties approximating those of a WFQ scheduler while having a relatively low complexity, causing use thereof to be feasible within high-speed network devices. By measuring the output characteristics, e.g., delay and jitter of the scheduler 105, the desired characteristics may be measured and compared using specific traffic patterns at the plurality of input ports 122 (1-N). In this way, a scheduler algorithm referred to as "Low Calculation Complexity Weighted Fair Queuing" (LC2WFQ) may be implemented based on the scheduler logic 105a for the scheduler 105 to provide low calculation complexity and fairness/delay bound characteristics that may be comparable to some timestamp schedulers, such as WFQ scheduling algorithm in one embodiment.

Figure 2:
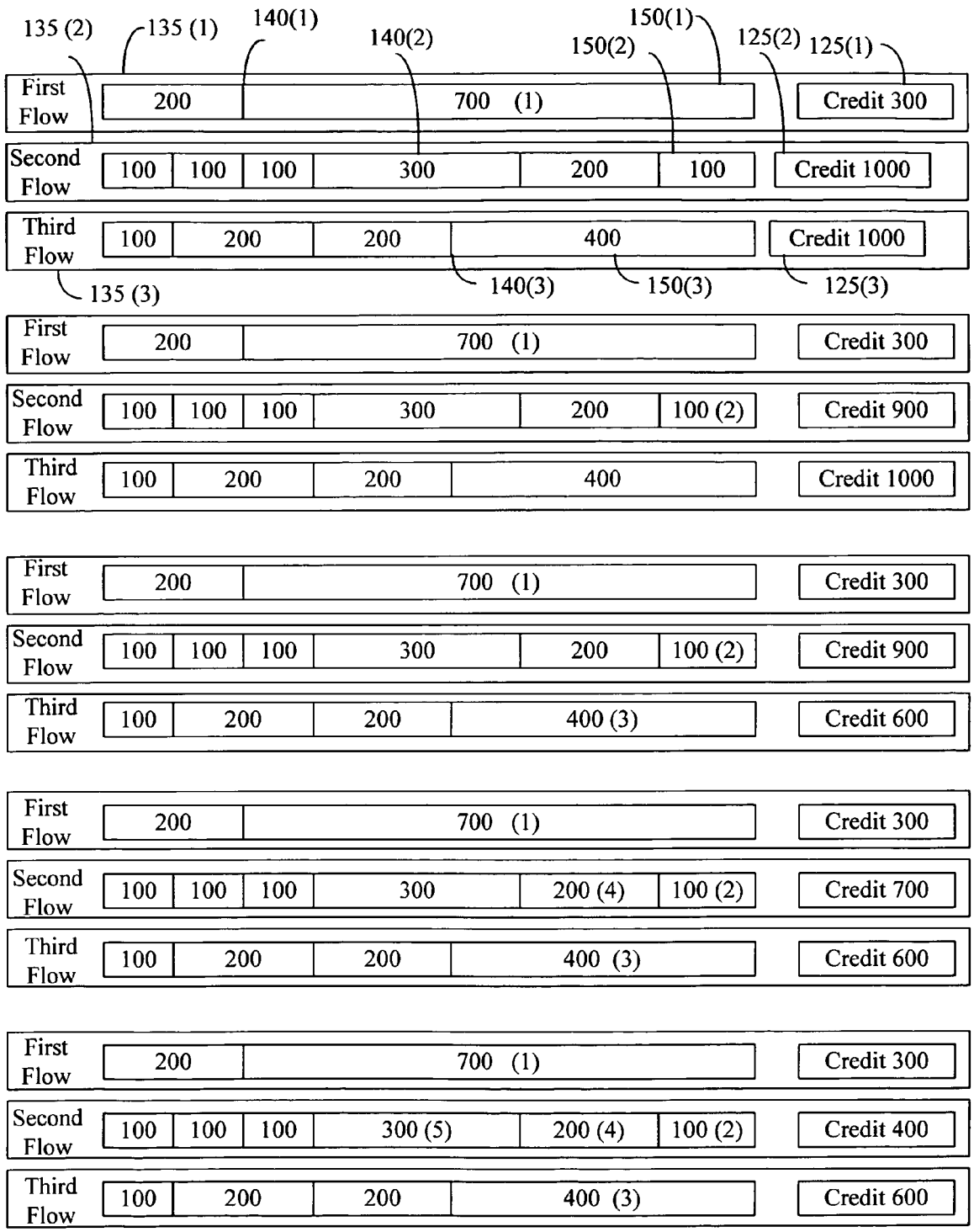
FIG. 2 shows an exemplary scheduling of three continuously backlogged flows of outgoing packet stream by keeping track of the service difference received between two or more flows using a credit counter per flow and selecting the flow for service next that has the maximum credit value according to one embodiment of the present invention.

Referring now to FIG. 2, an exemplary scheduling of three continuously backlogged flows, such as the first, second, third flows 135(1-3) of outgoing packet stream is illustrated by keeping track of the service difference received between two or more flows 135 using a credit counter 145 per flow and selecting the flow 135 for service next that has the maximum credit value in accordance with the one embodiment of the present invention. Specifically, the scheduler logic 105a may decrement because pawning credit counter by the amount of service received (for example, bytes sent), each time a packet, i.e., the outgoing packet 132 is served from a flow. In the first, second, third flows 135(1-3) of outgoing packet stream, as illustrated in FIG. 2, an equal weight value is associated with each flow for convenience. However, a different weight value may be associated in other embodiments of the present invention without deviating from the scope of the present invention.

A flow 135 of outgoing packet stream may refer to a stream of packets that traverses the same route from source to destination and requires the same grade of service. In addition, a packet may comprise one or more pre-specified fields in a packet header so that each packet may be uniquely assigned to a flow 135 of outgoing packet stream using at least one of the pre-specified fields in the packet header. In one embodiment, the scheduler 105 may queue separately packets belonging to different flows 135 of outgoing packet stream. A flow 135 may become a backlogged flow when during a pre-defined interval the queue 140 for the corresponding flow 135 of outgoing packet stream may not get empty at all.

Likewise, a weight value $w_i$ of a flow $f_i$ ID may refer to an associated reserved bandwidth that may be normalized with respect to the total bandwidth R of the output link 110 (service rate), i.e.:

$$w_i = \frac{r_i}{R}$$

In other words, the weight value $w_i$ of a flow 135 of outgoing packet stream may represent the fraction or ration of the output bandwidth that is reserved for a flow $f_i$ of outgoing packet stream. Therefore:

$$\sum_{i=0}^{i=N-1} w_i \leq 1$$

As set forth above, the scheduling algorithm LC2WFQ based on the scheduler logic 105a may fulfill characteristics for (a) Fairness; (b) Low delay bound; and Low computational complexity. More specifically, a commonly used definition of fairness essentially calls for that to be fair, the difference between the normalized service received between two backlogged flows of outgoing packet stream, j,f, e.g., the first and second flows 135(1-2) of outgoing packet stream shown in FIGS. 1-2, over any time period to be bounded to a relatively small constant H. This constant ideally is kept as close as to 0.

$$\left| \frac{Sj(t1, t2)}{w_j} - \frac{Sf(t1, t2)}{w_f} \right| \leq H(j, f)$$

For the GPS model, the constant H is set to be 0. The scheduling algorithm LC2WFQ based on the scheduler logic 105a may provide fairness by keeping track of the service difference received between two or more flows 135 using a credit counter 145 per flow and selecting the flow 135 of outgoing packet stream that has the maximum credit value. In each instance when a packet from a flow of outgoing packet stream is served, the corresponding credit counter 145 may be decremented by the amount of service received, e.g., in terms of the bytes sent.

In the scheduling example illustrated in FIG. 2, the scheduling algorithm LC2WFQ based on the scheduler logic 105a may set an initial value to be "1000" in all the credit counters 145(1-3). This initial value may be set when the scheduler 105 may be idle, that is, when no packets are waiting to be served. The scheduler 105 may start with scheduling the first flow 135(1) of outgoing packet stream which has a head-end packet of size "700." At the moment the packet 150(1) gets served, the corresponding credit counter 145(1) is decremented by "700." Thereafter, the scheduling algorithm LC2WFQ schedules the next flow, that is, a flow with the maximum credit counter value. In the example, both the flows 135(2-3) of outgoing packet stream have the same credit value "1000," stored in the credit counters 145(2-3), respectively.

To provide only fairness, the scheduling algorithm LC2WFQ may either schedule the second flow 135(2) of outgoing packet stream or the third flow 135(3) of outgoing packet stream in some embodiments of the present invention. For example, the second flow 135(2) of outgoing packet stream may the next flow scheduled by the scheduling algorithm LC2WFQ. When the head-end packet of the second flow 135(2) of outgoing packet stream gets served, the third flow 135(3) of outgoing packet stream ends up with the maximum credit counter value, indicating that the third flow 135(3) of outgoing packet stream to be scheduled next. In this way, the scheduling algorithm LC2WFQ may continue to schedule one or more flows of outgoing packet stream at the network device 115.

However, it is to be recognized that at any moment in time the scheduling algorithm LC2WFQ schedules one or more flows of outgoing packet stream, the credit value difference between any two backlogged flows of outgoing packet stream cannot deviate by more then the maximum packet size "m" of all the packets arriving at the network device 115 in the incoming packet traffic 107. In another situation, having two backlogged flows of outgoing packet stream where both the backlogged flows expect use of half of the available output bandwidth on the output link 110, the scheduling algorithm LC2WFQ may schedule one or more flows of outgoing packet stream for service in a different manner. Since the credit difference between the two flows cannot deviate by more then the maximum packet size "m," the service received by the two flows may not deviate by more then "2m," providing fairness (low) bound substantially equals that of a Worst-Case Fair Weighted Fair Queuing ($WF^2Q$) scheduler.

When one or more flows 135 remain continuously backlogged, the scheduler 105 may avoid being idle so the credit counters 145 of the backlogged flows of outgoing packet stream may be decremented around a predefined threshold value. The scheduling algorithm LC2WFQ may enable this way of decrementing by checking whether the credit counter value of the flow 135 of outgoing packet stream being scheduled drops below the threshold value. If this is the case, the scheduling algorithm LC2WFQ may increment all of the credit counters 145(1-N) by a delta value. The delta value may be selected to be equal to the difference between the threshold value and the credit counter value of a credit counter 145 that dropped below the threshold value.

For the flows 135 of outgoing packet stream having no packets waiting in the credit counters 145 to be incremented in a manner similar to a way the fairness may be provided, i.e., the maximum deviation between the credit counter values of the backlogged flows of outgoing packet stream can not be more than "m." As a result, the credit counters 145 may count between "0" and "2 m" with "m" being the threshold value. Accordingly, a flow 135 of outgoing packet stream having no packets queued in a queue 140 may eventually receive a credit value of "2m." As soon as such a flow becomes an active flow of outgoing packet stream, i.e., having a packet backlogged, the credit difference stays either less or equal to "m." Instead of "m," the scheduling algorithm LC2WFQ may use M, which is the maximum packet size that potentially may arrive during the execution of the scheduler 105 such that $M \geq m$.

Figure 3:
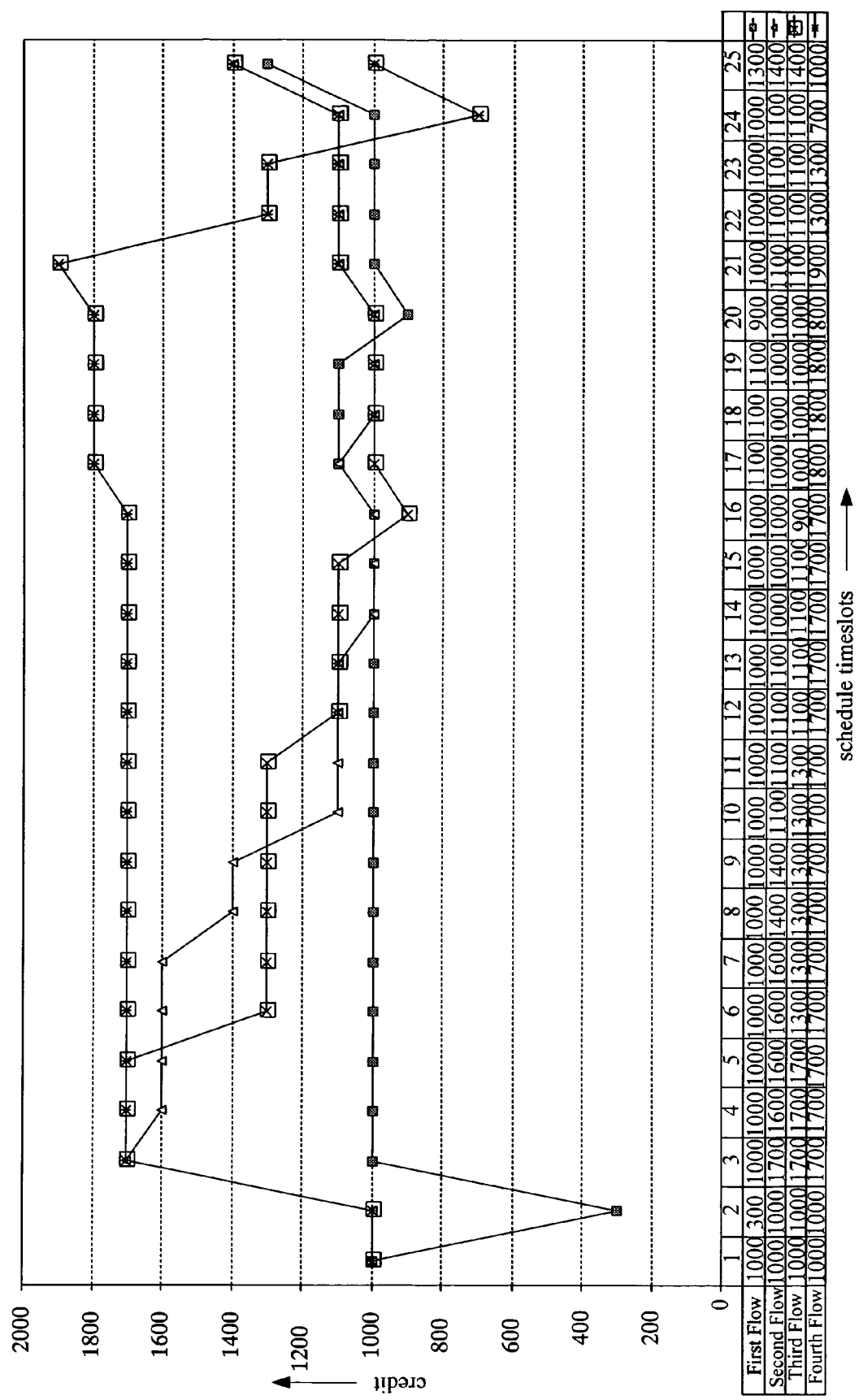
FIG. 3 schematically illustrates updating of a first, second and third credit counters in terms of credit counter values of the first, second and third flows of outgoing packet stream as a function of time consistent with one exemplary embodiment of the present invention.

Turning now to FIG. 3, updating of the first, second and third credit counters 145(1-3) is illustrated in terms of credit counter values of the first, second and third flows 135(1-3) of outgoing packet stream as a function of time in accordance with one exemplary embodiment of the present invention. As shown in FIG. 3, the scheduling algorithm LC2WFQ based on the scheduler logic 105a may control the credit counter values of the three flows 135(1-3) of outgoing packet stream as a function of time taken from the example shown in FIG. 2, incorporating the fairness and the other aspects of scheduling described above.

In FIG. 3, an extra flow called the fourth flow 135(4) of outgoing packet stream is added which has no backlogged packets until timeslot 21. From the timeslot 21 onwards, the corresponding queue 140 is illustrated to gain two packets of size 600. Each of the four flows 135(1-4) of outgoing packet stream may have substantially equal weight values associated therewith. A maximum size of a packet, i.e., M may be set to "1000" so that the scheduler 105 handles the maximum size of the packet either equal or less than "1000."

Besides providing a fair scheduling among the plurality of flows 135(1-N) of outgoing packet stream, the scheduler 105 may ensure a low delay bound for this fair scheduling, in some embodiments. That is, the scheduling algorithm LC2WFQ based on the scheduler logic 105a causes the maximum packet delay experienced by a flow 135 whose traffic complies with the minimum guaranteed bandwidth agreed upon.

Using the previous example shown in FIG. 2 again for FIG. 3, the first flow scheduled is the first flow 135(1) of outgoing packet stream having a front-end packet of size 700 even though the second flow 135(2) of outgoing packet stream has a front-end packet of size 100 with an earliest finish time, i.e., the time it would take for a packet to be completely served, of all the packets waiting to be served. This is so because the scheduling algorithm LC2WFQ based on the scheduler logic 105a takes the credit counter values into consideration for scheduling a next flow of outgoing packet stream.

The scheduling algorithm LC2WFQ may schedule a flow on the output link 110 among the plurality of flows 135(1-N) of the incoming packet traffic 107 at the network device 115 associated with the data network 120. For providing fairness, the scheduling algorithm LC2WFQ determines a larger indication, which implicitly indicates a next flow of outgoing packet stream to be served. Based on the larger indication, a packet, such as a front-end packet of the next flow of outgoing packet stream is served. The larger indication is updated afterwards with the update value based on the front-end packet size of the next flow being served. After the update, the selection for a subsequent flow starts.

Specifically, the scheduling algorithm LC2WFQ selects a next flow of outgoing packet stream from all the backlogged flows 135(1-3) being a flow 135 of outgoing packet stream that has the largest indication 125, e.g., the maximum credit value. The next flow currently being served is used to update the corresponding credit counter (and the other credit counters when the credit counter value drops below the threshold value). In the update, the scheduling algorithm LC2WFQ first updates the credit counter of the next flow currently being served and, if the credit counter of the next flow being served drops below the threshold value, the scheduling algorithm LC2WFQ updates all the other credit counters 145 including the one that dropped below the threshold value. After this update, to select the subsequent flow to be served, each backlogged flow 135(1-3) examines the associated credit counter value and the associated front-end packet size. To provide, a combination of the fairness with the low delay bound, the scheduling algorithm LC2WFQ subtracts the front-end packet 150 size of the next flow of outgoing packet stream currently being served from the largest indication 125 in the credit counter 145.

By combining the fairness with the low delay bound, the scheduler 105 may provide characteristics substantially similar to that of a WFQ scheduler or a $WF^2Q$ scheduler in terms of the average queuing delay of packets in a flow of outgoing packet stream and the startup latency, i.e., the time a scheduler takes for the first packet of a flow of outgoing packet stream to serve completely, causing the delay bound of the scheduler 105 to approach that of the WFQ and $WF^2Q$ schedulers.

Table 1 shows a scheduling algorithm LC2WFQ in pseudo-code based on the scheduler logic 105a to implement the scheduler 105. The scheduling algorithm LC2WFQ comprises three portions including an initialization portion, an en-queuing portion, and a de-queuing portion. In particular, an initialization process may be invoked by the scheduling algorithm LC2WFQ when the scheduler 105 starts to set a threshold value (line 2) substantially equal to the maximum packet size, i.e., M that may potentially arrive during the execution of the scheduler 105. When the scheduler 105 is expected to handle jumbo packets, for example, the threshold value may be set to 10K byte. Furthermore, in the initialization process, the scheduler 105 may set an upper bound credit value (line 3), i.e., the maximum value, i.e., 2M by which the credit counters 145 may be upper-bounded. An activity counter (line 4) may be initialized to track whether one or more packets are queued. Initialization of the credit counters 145 with the threshold value (line 4-7), one per flow, may be performed in the initialization process as well.

Likewise, an en-queuing process may be invoked by the scheduling algorithm LC2WFQ when a packet arrives in the network device 115, causing the scheduler 105 to serve a flow of outgoing packet stream. The scheduling algorithm LC2WFQ may extract first a flow ID from the packet header (line 10). The flow ID is extracted by means of classification using a combination of packet header fields, e.g., a source address, a destination address, a virtual local area network (VLAN) tag, or an input port 122 the packet arrives upon. Using the queue 140 that corresponds to the extracted flow ID, the scheduling algorithm LC2WFQ (line 11) may then en-queue the packet. Whenever a packet is queued, the activity counter may be incremented by one (line 12).

The scheduling algorithm LC2WFQ may invoke a de-queuing process to check if there are flows 135 of outgoing packet stream that have packets waiting to be served (line 16). If there are no packets waiting, then the scheduler 105 becomes idle, resulting in all the credit counters 145(13) being preset to the threshold value (line 46-48). If there are packets queued, the scheduler 105 may determine an active flow that has the maximum credit value in the credit counter 145 after the corresponding front-end packet size (line 17-23) is subtracted therefrom.

Thereafter, the scheduling algorithm LC2WFQ may select the flow 135 of outgoing packet stream with the maximum credit value and to de-queue and send the packet (line 24-35), decrement the activity counter by one (line 29), and subtract the packet size from the credit counter 145 of the flow 135 being served (line 30). After registering the index of the flow scheduled, the scheduling algorithm LC2WFQ may check if the credit counter value of the flow just scheduled has dropped below the threshold value (line 36). If this is the case, all credit counters 145(1-N) may be incremented by the delta value (line 37-39). Finally, the credit counters 145(1-N) may be checked to determine whether the upper bound value of the credit value is violated (line 40-42) since the upper bound value may be reached by the flows of outgoing packet stream that have no packets backlogged.

TABLE 1

Scheduling Algorithm LC2WFQ

```
1    Initialization
2        threshold                    = max_packet_size;
3        credit_upper_bound           = 2 * threshold;
4        active                       = 0;
5        for (i = 0; i < flows; i = i + 1)
6            credit[i] = threshold;
7        end for;
8
9    Enqueuing (invoked when packet p arrives)
10       i = ExtractFlowId(p);
11       Enqueue (p, i);
12       active = active + 1;
13
14   Dequeuing
15       while (true)
16           if (active > 0) then
17               max_value = 0;
18               for (i = 0; i < flows; i = i + 1)
```

TABLE 1-continued

Scheduling Algorithm LC2WFQ

```
19               if ( NotEmpty (queue[i]) ) then
20                   packet_size = Size(Head(queue[i]));
21                   max_value = MAX (max_value,
     (credit[i] - packet_size));
22               end if;
23           end for;
24           for (i = 0; i < flows; i = i + 1)
25               if ( NotEmpty (queue[i]) ) then
26                   packet_size = Size(Head(queue[i]));
27                   if ( max_value = = (credit[i] -
     packet_size) ) then
28                       Send (Dequeue(queue[i]));
29                       active = active - 1;
30                       credit[i] = credit[i] -
     packet_size;
31                       last_index = i;
32                       break;
33                   end if;
34               end if;
35           end for;
36           if (credit[last_index] < threshold) then
37               delta = threshold - credit[last_index];
38               for (i = 0; i < flows; i = i + 1)
39                   credit[i] = credit [i] + delta;
40                   if ( credit[i] > credit_upper_bound)
     then
41                       credit [i] =
     credit_upper_bound;
42                   end if;
43               end for;
44           end if;
45           else
46               for (i = 0; i < flows; i = i + 1)
47                   credit[i] = threshold;
48               end for;
49           end if;
50       end while;
```

Another embodiment of the present invention may incorporate weights in the scheduling algorithm LC2WFQ to specify a given minimum guaranteed bandwidth each flow may be entitled to. To this end, the scheduling algorithm LC2WFQ may associate a weight value with each flow 135 of outgoing packet stream to indicate the corresponding minimum guaranteed bandwidth. By incorporating weights in this manner, the scheduling algorithm LC2WFQ may discriminate between QoS classes since each QoS class may have own delay characteristics, the flows 135 of outgoing packet stream that belong to a particular QoS class may desire a minimum guaranteed bandwidth to accommodate the delay characteristics associated therewith.

In one embodiment, the service received by a flow 135 of outgoing packet stream may be proportional to the number of bytes sent over the output link 110 and inversely proportional to the credit counter value stored as the indication 125 of serving outgoing packet in the credit counter 145. A weight-based credit count value of a flow 135 of outgoing packet stream may depend on the size of the packet just served and the weight value associated therewith. When the weight value is low, the minimum guaranteed bandwidth is low, therefore, for the credit counter decrement to be high the line 30 of the scheduling algorithm LC2WFQ set forth in Table 1 above may become:

$$credit[i] = credit[i] - packet\_size/weight[I];$$

Depending upon a desired accuracy for controlling the minimum guaranteed bandwidth of a flow of outgoing packet stream, the maximum deviation between the credit counter values may increase. For a service rate of 1 Gb/s, and to specify the minimum guaranteed bandwidth of flows in steps of 1 Mb/s (weight=0.001), instead of a maximum deviation of 1M the deviation may become 1000M so the threshold value (line 2) in Table 2 may be set to max_packet_size*1000. Likewise, the credit count upper bound value may be similarly adjusted as well.

The weight values not only plays a role in updating the credit counter values, but also determines the next flow of outgoing packet stream to schedule based on a combination of credit counter value and a front-end packet size. The front-end packet size may be used as a measure for the packet finish time. A packet finish time value may depend on the corresponding flow weight value. In another case, a weight value equal to zero could mean that a packet may never be served because the corresponding flow of outgoing packet stream has a minimum guaranteed bandwidth of "0." In other words, the lower the weight value, the longer it may take for a packet to be completely served. This means that the following lines of the scheduling algorithm LC2WFQ set forth in Table 1 become:

Line 21: max_value=MAX(max_value,(credit[$i$]–packet_size/weight$i$]));

Line 27: if (max_value==(credit[$i$]–packet_size/weight[$i$])) then

However, a weight value of "0" may be avoided, as the line 21, line 27, and line 30 include divide by zero. Thus, each flow 135 of outgoing packet stream at least gets a given minimum guaranteed bandwidth equal to the minimum weight value multiplied by the service rate.

Table 2 shows the scheduling algorithm LC2WFQ that incorporates weights.

```
1    Initialization
2        threshold                = max_packet_size;
3        credit_upper_bound       = 2 * threshold;
4        active                   = 0;
5        for (i = 0; i < flows; i = i + 1)
6            credit[i] = threshold;
7        end for;
8
9    Enqueuing (invoked when packet p arrives)
10       i = ExtractFlowId(p);
11       Enqueue (p, i);
12       active = active + 1;
13
14   Dequeuing
15       while (true)
16           if (active > 0) then
17               max_value = 0;
18               for (i = 0; i < flows; i = i + 1)
19                   if ( NotEmpty (queue[i]) ) then
20                       packet_size = Size(Head(queue[i]));
21                       max_value = MAX (max_value,
     (credit[i] - packet_size/weight[i]));
22                   end if;
23               end for;
24               for (i = 0; i < flows; i = i + 1)
25                   if ( NotEmpty (queue[i]) ) then
26                       packet_size = Size(Head(queue[i]));
27                       if ( max_value = = (credit[i] -
     packet_size/weight[i]) ) then
28                           Send (Dequeue(queue[i]));
29                           active = active - 1;
30                           credit[i] = credit[i] -
     packet_size/weight[i];
31                           last_index = i;
32                           break;
33                       end if;
34                   end if;
35               end for;
36               if (credit[last_index] < threshold) then
37                   delta = threshold - credit[last_index];
38                   for (i = 0; i < flows; i = i + 1)
39                       credit[i] = credit [i] + delta;
40                       if ( credit[i] > credit_upper_bound)
     then
41                           credit [i] =
     credit_upper_bound;
42                       end if;
43                   end for;
44               end if;
45           else
46               for (i = 0; i < flows; i = i + 1)
47                   credit[i] = threshold;
48               end for;
49           end if;
50       end while;
```

The scheduling algorithm LC2WFQ that incorporates weights based on the scheduler logic 105a, as shown in Table 2, may be implemented in hardware or software or firmware or combination thereof.

Figure 4:
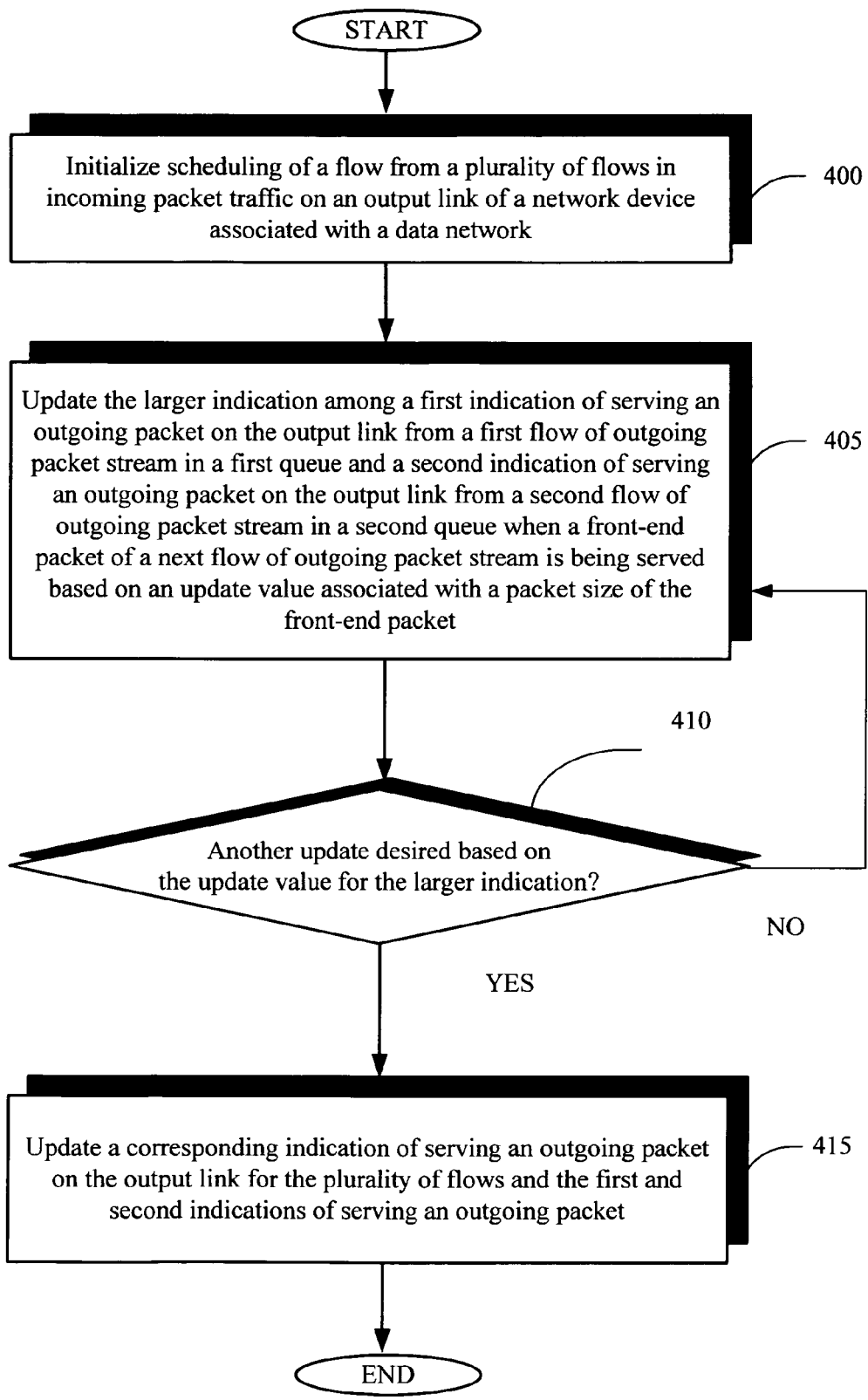
FIG. 4 depicts a stylized representation of a method implemented for scheduling a flow from the plurality of flows of outgoing packet stream, as shown in FIG. 1, in the incoming packet traffic on the output link of the network device associated with the data network according to one embodiment of the present invention.

Referring to FIG. 4, a stylized representation of a method implemented for scheduling a flow from the plurality of flows 135(1-3) of outgoing packet stream, as shown in FIG. 1, in the incoming packet traffic 107 on the output link 110 of the network device 115 associated with the data network 120 is illustrated according to one embodiment of the present invention. At block 400, the scheduler 105 may initialize the scheduler logic 105a to schedule a flow upon selection thereof to be served next from the plurality of flows 135 (1-3) of outgoing packet stream. The initialization of the scheduler logic 105a may include resetting the credit values in the credit counters 145(1-3) to a predefined counter value, such as "1000," as shown in FIG. 2 in the corresponding indications 125 (1-3) of serving an outgoing packet.

For fairness, the larger indication being the credit counter 145 with the maximum credit value may be used, as shown in FIGS. 2 and 3. However, a combination of a credit counter value and a front-end packet size may be used for updating the credit counter value on the flow 135 that is currently being served.

The amount of service requested, e.g., based on the front-end packet size may be subtracted form the credit counter value to update the credit counter 145 on the flow 135 that is currently being served, unless the credit counter value drops below the threshold value, in that case all credit counters 145(1-N) may be updated, in some embodiments. The selection prior to serving a packet may be based on the combination of the credit counter value minus the service desired.

As shown in block 405, the scheduler logic 105a may update the larger indication, i.e., the maximum credit flow value among the current flow values as indicated by the corresponding indication 125 within the credit counter 145. This update of the larger indication may occur when a front-end packet of a next flow of outgoing packet stream is being served. Moreover, the update of the larger indication may be based on an update value as described above, associated with a packet size of the front-end packet. The scheduler logic 105a may select a flow of outgoing packet stream having the maximum credit value indicated by the corresponding credit counter 145 minus the front-end packet size, from all backlogged flows, for example, the first, second and third flows 135(1-3) of outgoing packet stream. After the packet is dequeued, the outgoing packet 137 may be sent on the output link 110; the packet size of the front-end packet may be subtracted from the credit counter value of the current flow of outgoing packet stream being served.

A decision block 410, the scheduler logic 105a may ascertain whether or not another update is desired based on the amount or size of the update value determined for applying to the larger indication. Accordingly, at the decision block 410, the scheduler logic 105a may perform a check to determine whether the credit counter value of the flow 135 of outgoing packet stream just scheduled has dropped below the threshold value. If the credit counter value of the flow 135 of outgoing packet stream just scheduled drops below the threshold value, the scheduler logic 105a may update a corresponding indication of serving an outgoing packet on the output link 110 for the plurality of flows 135(1-N) of outgoing packet stream along with the first and second indications 125(1-2). In other words, the scheduler logic 105a may increment all of the credit counters 145(1-N) associated with the scheduler 105, including the credit counters 145(1-3) depicted in FIGS. 1 and 2, by a delta value regardless of whether a flow has a packet waiting to be served, as shown in block 415.

Figure 5:
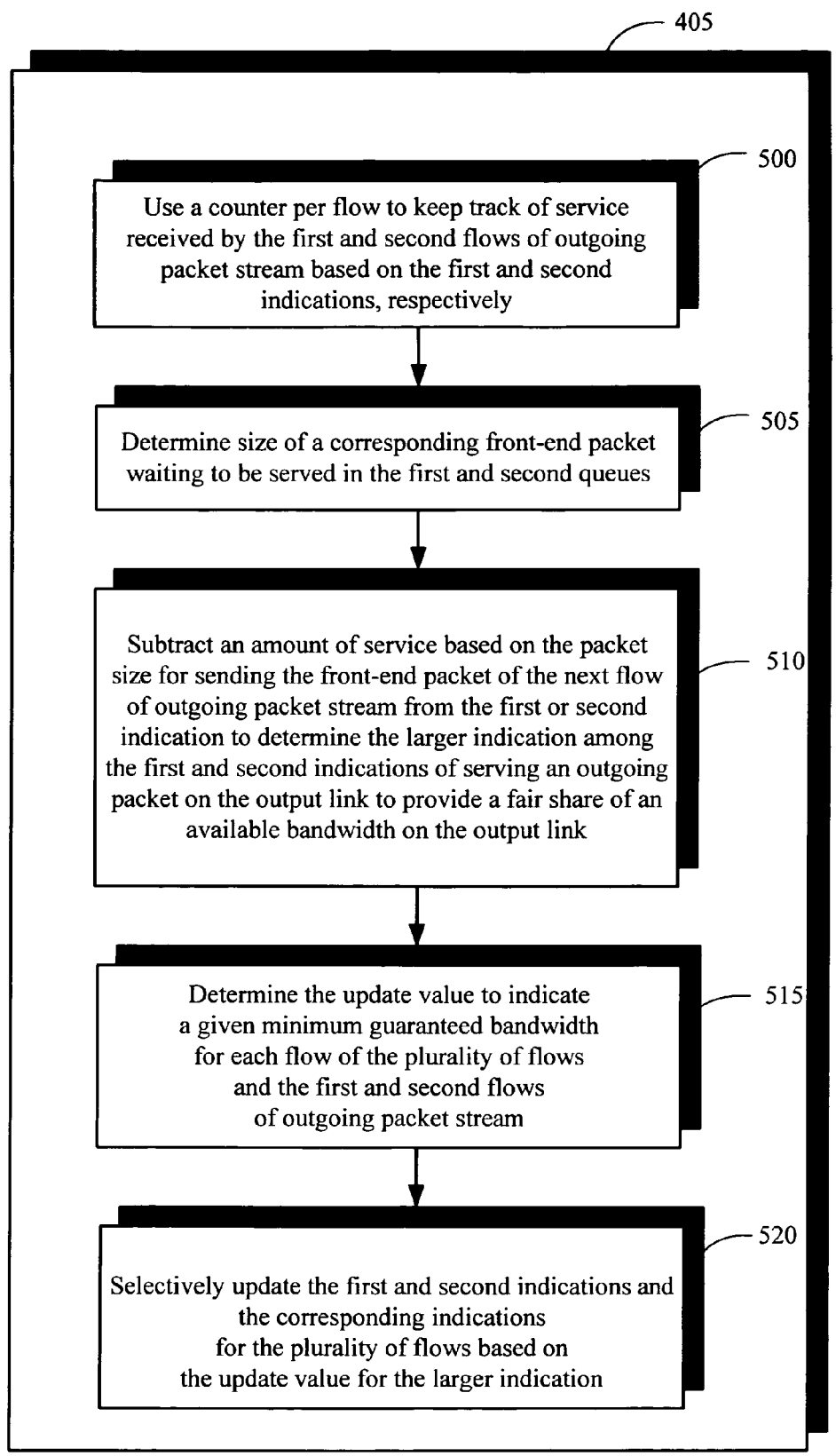
FIG. 5 illustrates a stylized representation of a method that uses the scheduler logic to provide a fair scheduling of flows while having a low delay bound in accordance with one embodiment of the present invention.

As shown in FIG. 5, a stylized representation of a method calls for using the scheduler logic 105a to provide a fair scheduling of flows while having a low delay bound in accordance with one embodiment of the present invention. A block 500 sets forth details for the block 405 shown in FIG. 4 in that the scheduler logic 105a may use a counter per flow to keep track of service received by each flow of outgoing packet stream based on a corresponding indication of serving an outgoing packet on the output link 110. At block 505, the scheduler logic 105a may determine size of a corresponding front-end packet waiting to be served in the first and second packet queues 140(1-2), as shown in FIG. 1. This size determination of the corresponding front-end packet enables the low delay bound.

By subtracting an amount of service based on the packet size for sending the front-end packet of the next flow of outgoing packet stream from the first or second indication 125(1 or 2), i.e., the current credit counter values, at block 510, the scheduler logic 105a may determine the larger indication among the first and second indications 125(1-2). The update for the maximum credit value among the backlogged flows 135 of outgoing packet stream may be determined by subtracting the packet size of the front-end packet of the next flow of outgoing packet stream. In this way, the scheduler logic 105a may provide a fair share of an available bandwidth on the output link 110 to each flow 135 of outgoing packet stream in the network device 115.

The scheduler logic 105a may determine the update value, a value indicative of the packet size of the front-end packet of the next flow that is currently being served, to indicate a given minimum guaranteed bandwidth for each flow of the plurality of flows 135(1-3) of outgoing packet stream at block 515. At block 520, the scheduler logic 105a may cause the scheduler 105 to determine a larger indication among the first and second indications 125(1-2) to select the next flow for service. Based on the update value for the larger indication, the scheduler 105 may selectively update the first and second indications 125(1-2) and the corresponding indications for the plurality of flows 135 (3-N) in the corresponding credit counter 145.

Figure 6:
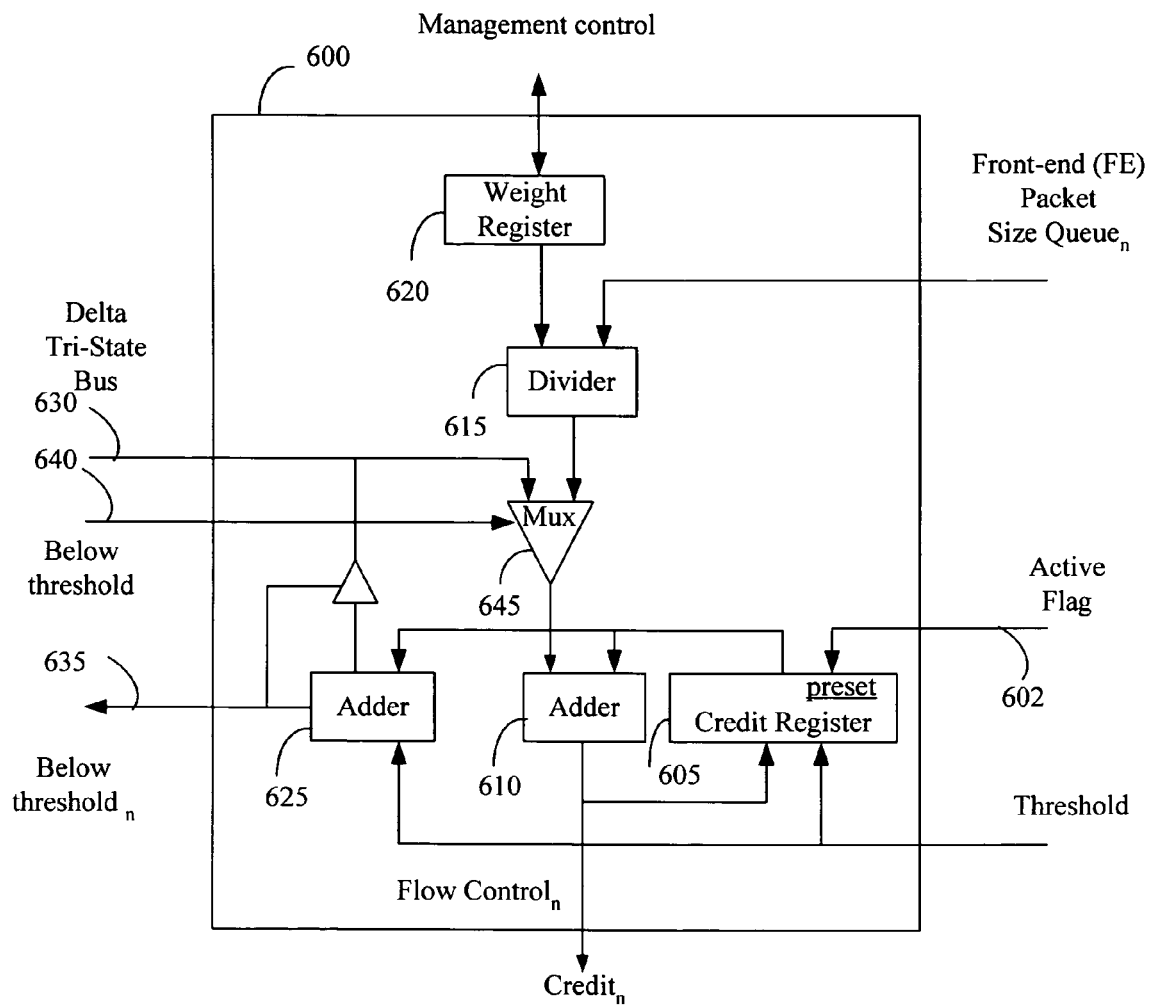
FIG. 6 schematically illustrates a flow control block per flow for the scheduler algorithm LC2WFQ to implement the flow controller shown in FIG. 1 according to one embodiment of the present invention.
Figure 7:
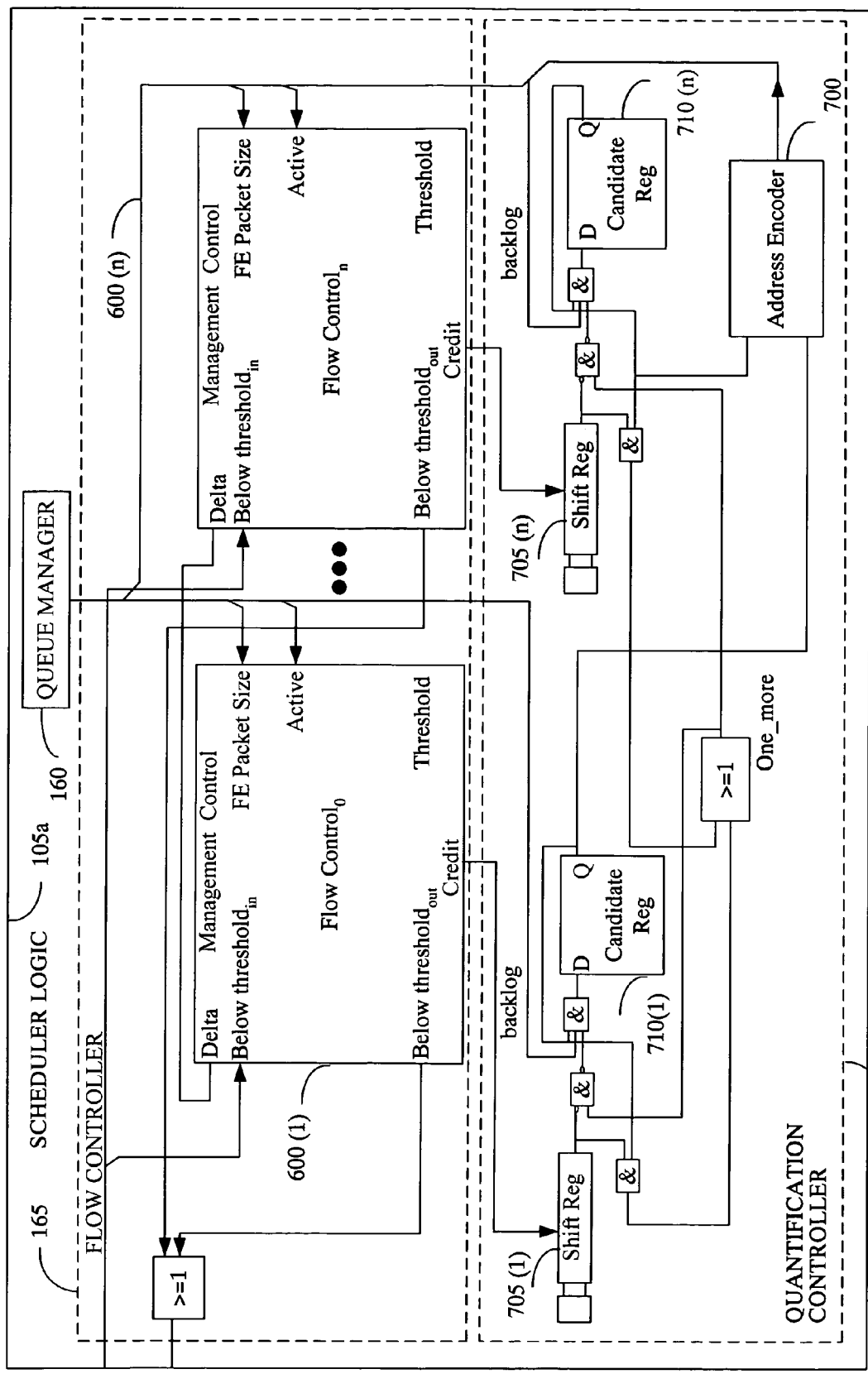
FIG. 7 schematically illustrates a high level architecture for the scheduler that uses the quantification controller shown in FIG. 1 to obtain the maximum credit value in accordance with one illustrative embodiment of the present invention.

As shown, FIGS. 6 and 7 schematically illustrate the scheduler 105 that implements the scheduler algorithm LC2WFQ based on the scheduler logic 105a. As depicted in FIG. 6, a flow control block 600 per flow 135 is illustrated for the scheduler algorithm LC2WFQ to implement the flow controller 165 shown in FIG. 1 according to one embodiment of the present invention. The simplified functional diagram of the flow control block 600 in FIG. 6 is not intended to show all details and timing relations than useful for a person of an ordinary skill in the art. Rather, specific details of the complexity of the scheduling algorithm LC2WFQ that incorporates weights are schematically depicted.

For example, in FIG. 7, for four QoS classes and eight scheduler input ports 122(1-8), thirty-two of the flow control blocks 600(1-32) may be coupled to form the flow controller 165. Each of the flow control blocks 600(1-32) may comprise a number of functional sub-blocks to implement the scheduling algorithm LC2WFQ that incorporates weights, as outlined in Table 2.

During initialization, as indicated by the scheduling algorithm LC2WFQ shown in Table 2 on lines 4-7, all the queues 140(1-3) may be empty. The scheduler 105 may set an active flag 602 low (e.g., setting a global queue management signal equal to 0) and preset a credit register 605 to the threshold value. Consistent with one embodiment, in response to queuing of a packet and independent of the flow 135 of outgoing packet stream, the active flag 602, i.e., the global queue management signal may become active. For the purposes of en-queuing a packet, the scheduling algorithm LC2WFQ on lines 10-12 indicate that after packet classification and queuing, the active flag 602 becomes high so that the credit register 605 in combination with an adder 610 may calculate a valid credit value for determining the next flow 135 of outgoing packet stream to schedule.

For de-queuing a packet, the scheduling algorithm LC2WFQ shown in Table 2 on lines 16, 46-48 indicates that whenever the scheduler 105 is idle, the active flag 602 may become low, resulting in a preset of the credit register 605. The scheduling algorithm LC2WFQ lines 20-21, 27 indicate that whenever there is one or more packet(s) is queued, a divider 615 may divide the size of the front-end packet by the weight value stored in a weight register 620. This intermediate value may be then used for determining the next flow 135 to schedule. To determine the next flow 135, the flow control block 600 of the flow controller 165 may subtract the intermediate value from the credit value stored in the credit register 605. The intermediate value may be the combination of the front-end packet size divided by the weight value. The result at the output of the adder 610 may then be used to determine the maximum credit value among all the flow control blocks 600(1-3) that have backlogged packets.

Whenever a packet gets served, the corresponding credit register 605 takes over the credit value at the output of the adder 610, as the algorithm lines 28-32 indicate in Table 2. The scheduler 105 may check in the algorithm lines 36-44 whether the credit value has dropped below the threshold value. If this is the case, then an adder 625 sets the delta value on a global tri-state delta bus 630 and activates a below threshold flag 635. The below threshold flags 630(1-n) may be gated by an "OR" port, resulting in a global below threshold flag 640 that may control a multiplexer 645. As a result, a credit register update of the flow control 600(1-n) blocks may occur. An active state of the global below threshold flag 640 causes the multiplexer 645 to pass the delta value instead of an output value from the divider 615. The delta value may then be added to the credit register value and feedback into the credit register 605. The adder 610 may implicitly respect an upper credit boundary value according to the lines 40 to 42 of the scheduling algorithm LC2WFQ shown in Table 2.

Referring to FIG. 7, a high level architecture is schematically depicted for the scheduler 105 that uses the quantification controller 170 shown in FIG. 1 to obtain the maximum credit value in accordance with one illustrative embodiment of the present invention. To this end, the quantification controller 170 may comprise an address encoder 700. Once the flow control block 600(s) is selected, the quantification controller 170 may use the address encoder 700 to point to the queue 140 of which the front-end packet is to be served next. When more that one flow control 160 blocks may be present with the same maximum credit value, the address encoder 700 may only select one of the corresponding queues 140. However, an order in which the queues 140 may be selected is essentially a design choice since the order may depend upon a particular implementation or a specific application of the scheduler 105.

In accordance with one embodiment of the present invention, the quantification controller 170 determines the flow control block 600 that has the maximum credit value of all the flows of outgoing packet stream 135(1-3) that have backlogged packets. For each flow control block 600, the scheduler 105 may store the credit value into a shift register 705 and initialize a candidate register 710 with a "one." The candidate register 710 may keep track whether the corresponding flow control block 600 is still a candidate with respect to the maximum credit value.

By streaming the credit value out of the shift-register 705 bit-by-bit (e.g., to shift from a most significant bit (MSB) to a least significant bit (LSB)) and comparing this value with the other streams, the scheduler 105 may determine if a flow 135 of outgoing packet stream remains a candidate or not. While a candidate stream is still a candidate if it has a current "1" bit, a stream with a current "0" bit may lose the candidacy if there another candidate stream remains that has a current "1" bit. In one embodiment, after the scheduler 105 shifts all bits out of the shift-registers 705(1-n), the remaining candidate register 710 that still has a "1" at the output may represent the flow control block 600 with the maximum credit value. An exemplary pseudo code for the scheduler 105 to determine the flow control block 600 with the maximum credit value may be illustrated as follows:

```
Current_bit [n]   // current bit of each of the N input streams
Candidate [n]     // 1 if the n'th stream is still a candidate for maximum
One_more          // if some remaining candidate stream bit is currently 1
One_more = Candidate [0] & Current_bit [0] | . . . | Candidate [n-1] &
Current_bit [n-1]
for (k=0; k < N; k=k+1)
    Candidate [k] = Candidate [k] & (Current_bit [k] | (~Current_bit
    [k] & ~One_more))
end for;
```

Besides the OR gates and the address encoder 700, the scheduler 105 may execute independently with respect to the number of flows 135 to be handled. In other words, the scheduler 105 may accomplish processing within a limited, fixed number of executions cycles. Depending upon the number of flows 135 of outgoing packet streams, the OR gates and address encoder 700 may add a delay due to some additional execution cycles. As an example, if a single logical block, like an OR gate handles four input signals within "1" execution cycle, to handle 256 flows, an extra delay of $Log_2(256)/2-1=3$ execution cycles may result.

Referring to FIGS. 8-13, simulation results are schematically illustrated for the scheduling algorithm LC2WFQ shown in Table 2 versus a conventional Weighted Fair Queuing (WFQ) scheduler and a conventional Deficit Round Robin (DRR) scheduler. As shown, FIGS. 8-13 illustrate a number of exemplary simulation results that compare a scheduler algorithm or "Low Calculation Complexity Weighted Fair Queuing" (LC2WFQ) based on the scheduler logic 105a of the scheduler 105 with results obtained for a WFQ and a DRR scheduler. More specifically, the simulation results compare the characteristics of scheduling algorithm LC2WFQ against the WFQ scheduler used as a benchmark scheduler and the DRR scheduler (a weighted version) often used in high-speed network devices. All the schedulers, i.e., the LC2WFQ, WFQ, and DRR have a service rate of 1 Gb/s and handle twenty-four flows 135. Each flow 135 is mapped to an input port 122 for convenience. In other words, all packets entering an input port 122 may be classified into a corresponding flow. The twenty-four input ports 122(1-24) may be configured as follows:

Port 1-6: weight=0.016/port→minimum guaranteed bandwidth of 16 Mb/s

Port 7-12: weight=0.050/port→minimum guaranteed bandwidth of 50 Mb/s

Port 13-18: weight=0.066/port→minimum guaranteed bandwidth of 66 Mb/s

Port 19-24: weight=0.033/port→minimum guaranteed bandwidth of 33 Mb/s

Figure 8:
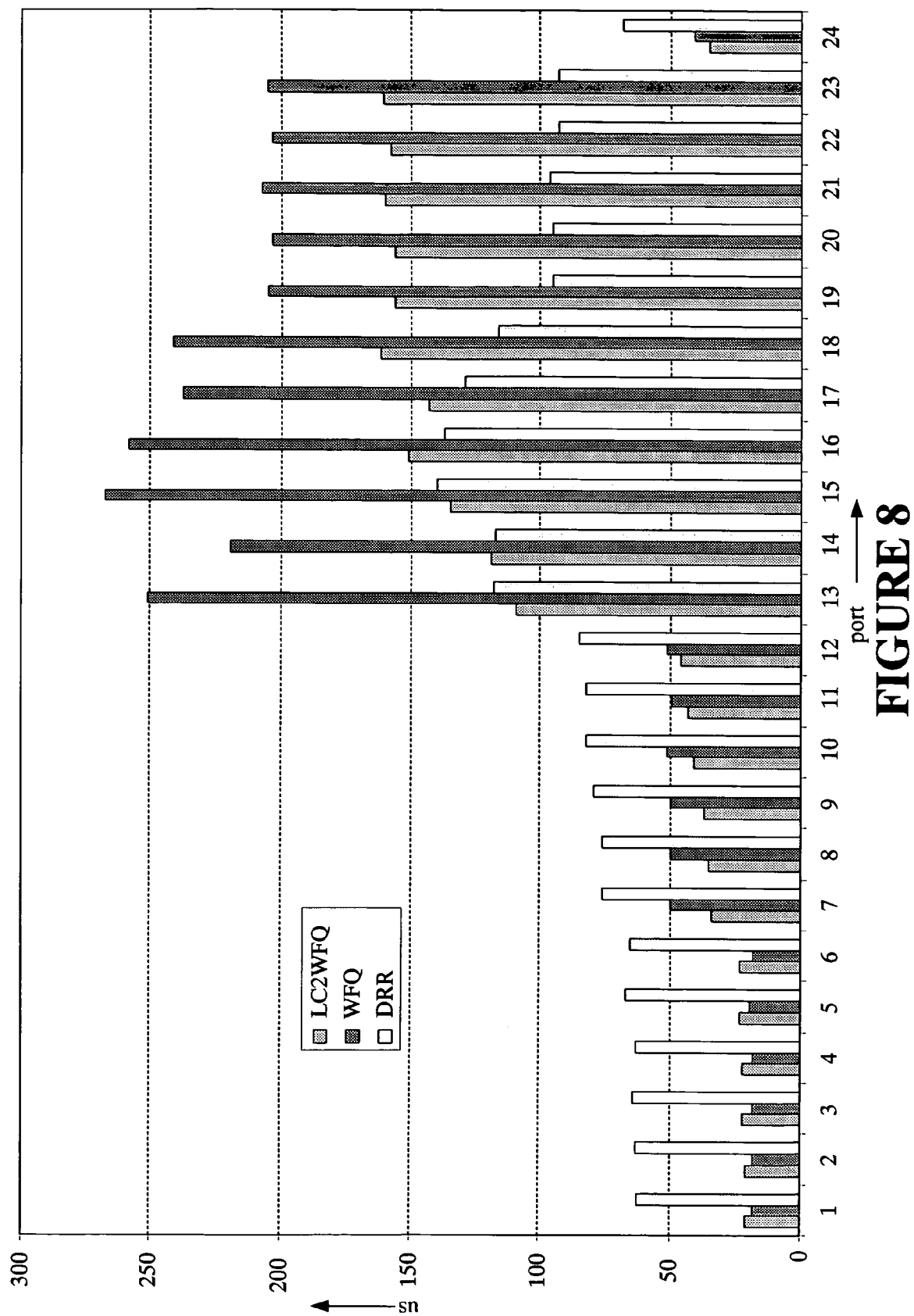
FIG. 8 illustrates exemplary simulation results that compare an average latency characteristic through the scheduler based on the simulation algorithm LC2WFQ, which implements the scheduler logic against the WFQ scheduler and the DRR scheduler when all traffic at the input ports shown in FIG. 1 complies with the minimum guaranteed bandwidth.
Figure 9:
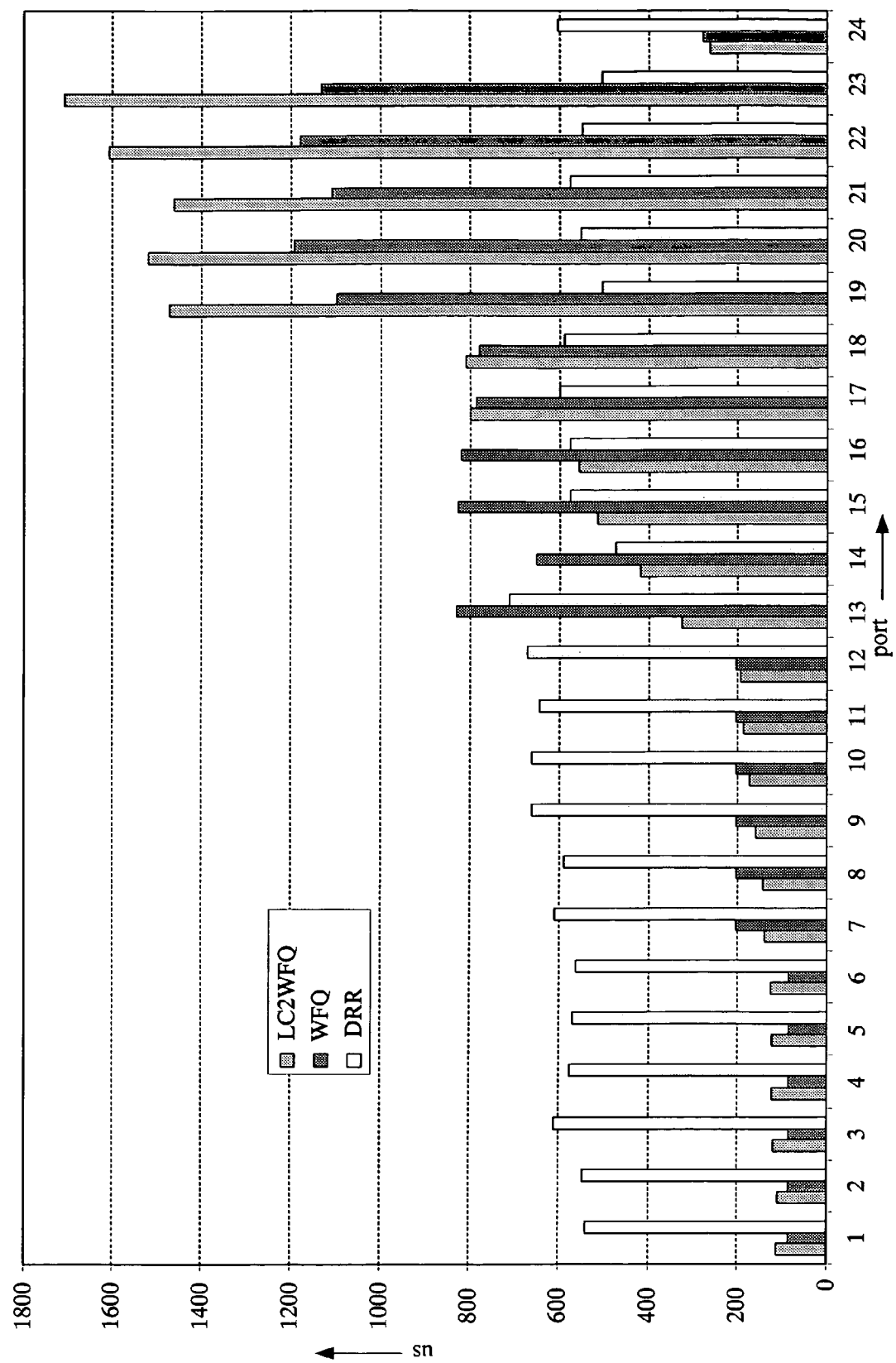
FIG. 9 illustrates exemplary simulation results that compare a maximum latency characteristic through the scheduler based on the simulation algorithm LC2WFQ, which implements the scheduler logic against the WFQ scheduler and the DRR scheduler when all traffic at the input ports shown in FIG. 1 complies with the minimum guaranteed bandwidth.
Figure 10:
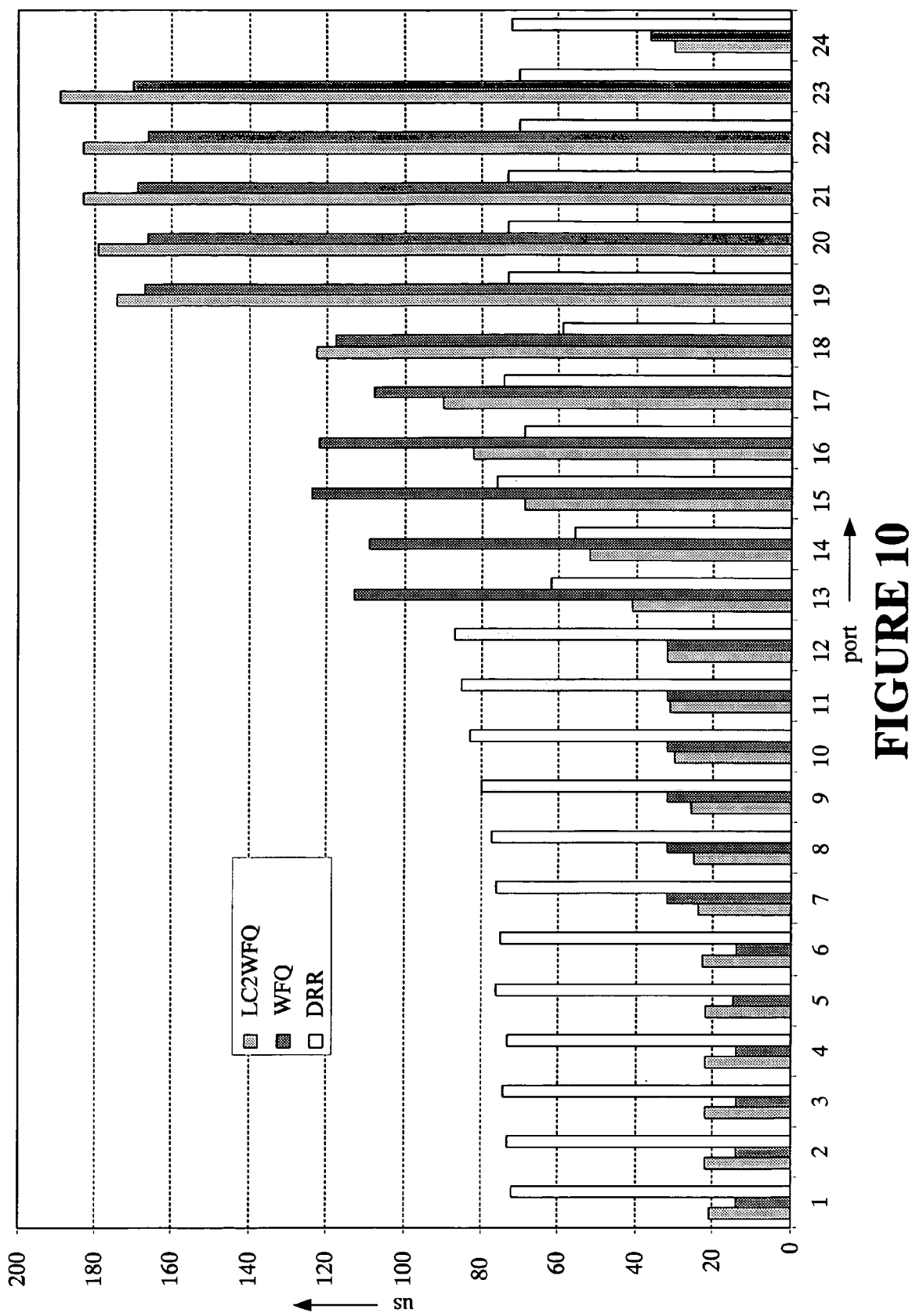
FIG. 10 illustrates exemplary simulation results that compare a latency standard deviation characteristic through the scheduler based on the simulation algorithm LC2WFQ, which implements the scheduler logic against the WFQ scheduler and the DRR scheduler when all traffic at the input ports shown in FIG. 1 complies with the minimum guaranteed bandwidth.
Figure 11:
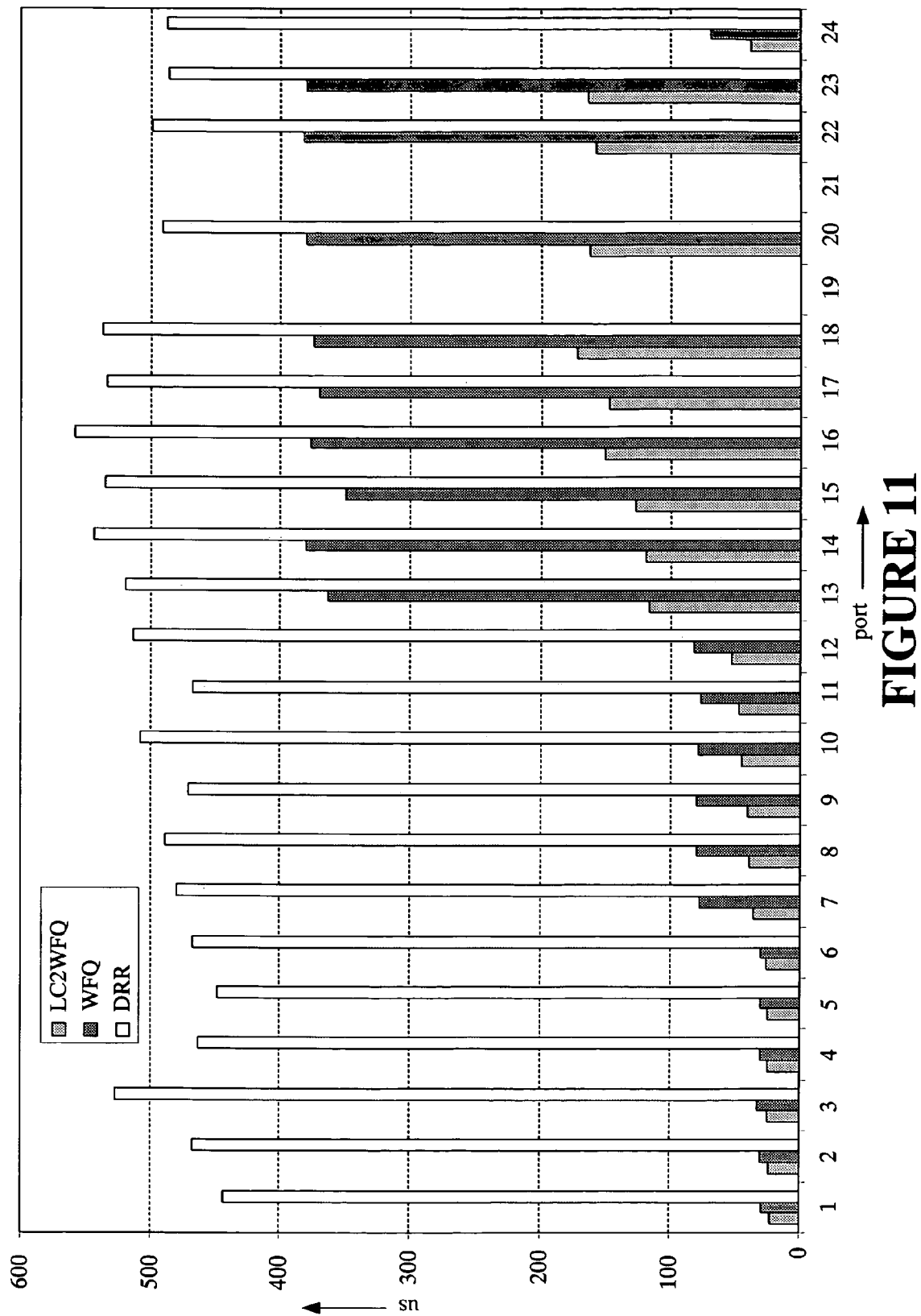
FIG. 11 illustrates exemplary simulation results that compare an average latency characteristic through the scheduler based on the simulation algorithm LC2WFQ, which implements the scheduler logic against the WFQ scheduler and the DRR scheduler when some of the input ports shown in FIG. 1 misbehave by sending more traffic than agreed upon.
Figure 12:
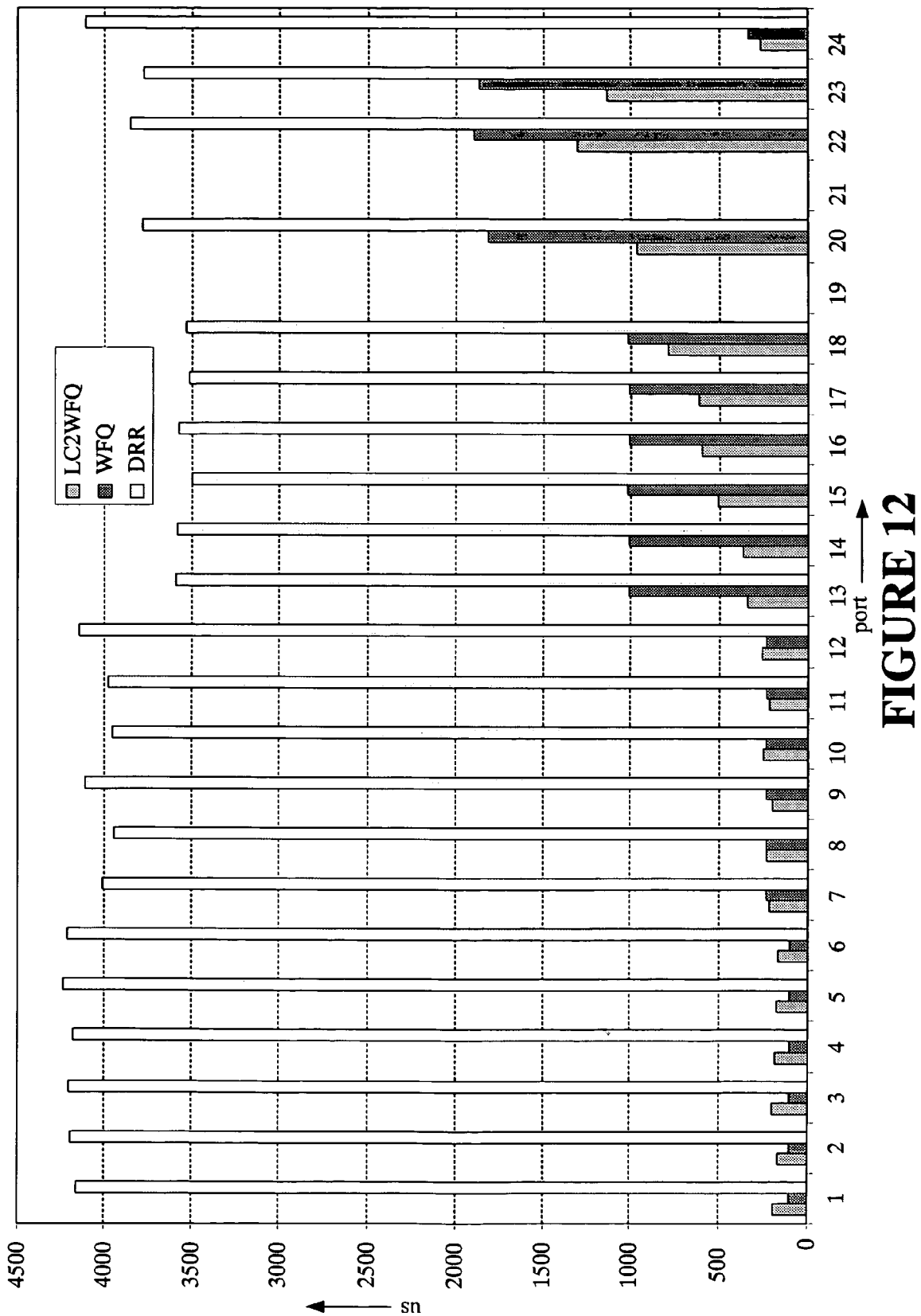
FIG. 12 illustrates exemplary simulation results that compare a maximum latency characteristic through the scheduler based on the simulation algorithm LC2WFQ, which implements the scheduler logic against the WFQ scheduler and the DRR scheduler when some of the input ports shown in FIG. 1 misbehave by sending more traffic than agreed upon.
Figure 13:
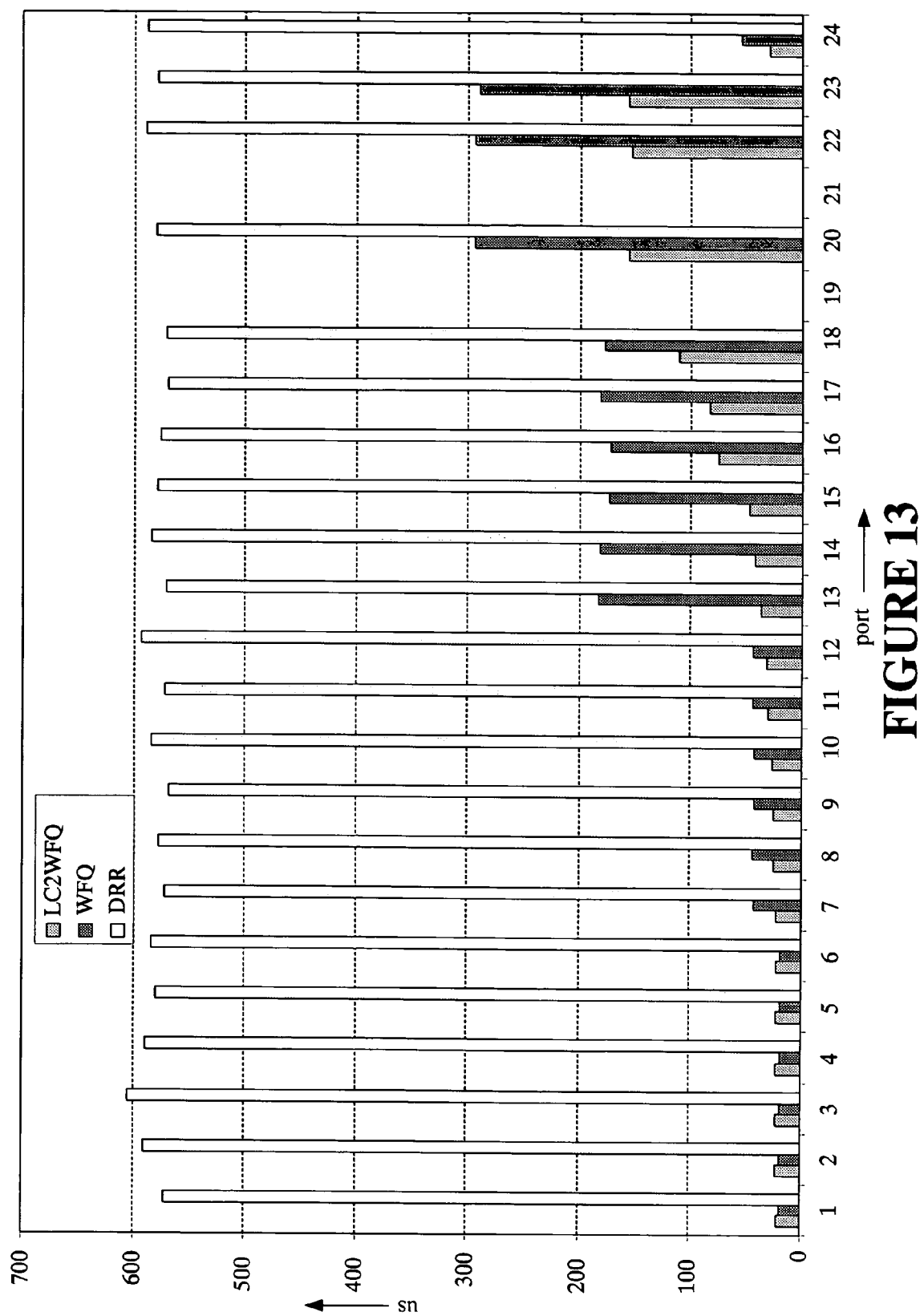
FIG. 13 illustrates exemplary simulation results that compare a latency standard deviation characteristic through the scheduler based on the simulation algorithm LC2WFQ, which implements the scheduler logic against the WFQ scheduler and the DRR scheduler when some of the input ports shown in FIG. 1 misbehave by sending more traffic than agreed upon.

For a first simulation out of two simulations, in FIGS. 8-10, the simulation results show characteristics of the LC2WFQ, WFQ, DRR schedulers when all traffic at the input ports 122(1-24) complies with the minimum guaranteed bandwidth. A second simulation, in FIGS. 11-13, shows the characteristics of the LC2WFQ, WFQ, DRR schedulers when the input ports 122(19) and 122(21) may misbehave by sending more traffic than agreed upon. For example, instead of 33 Mb/s. these input ports 122(19) and 122(21) may send 110 Mb/s of traffic.

For traffic generation, the first and second simulations use on-of generators with a Pareto distribution. The average "ON" time may be selected to be 0.5 sec and the average of time as 0.1 sec. A traffic generator may send the following type of packets:

Port 1-6: constant packet size of 200 byte

Port 7-12: constant packet size 1500 byte

Port 13-18: constant packet size of 9000 byte

Port 19-23: uniform distributed packet size between 64 byte and 9000 byte

Port 24: uniform distributed packet size between 64 byte and 1500 byte

The first and second simulation results in FIGS. 8, 11, respectively show an average latency through the scheduler 105, i.e., a scheduler based on the simulation algorithm LC2WFQ, which implements the scheduler logic 105a and the WFQ, DRR schedulers. Likewise, FIGS. 9, 12, respectively show the maximum latency, and FIGS. 10, 13, respectively the latency standard deviation. The latter is a measure for the delay variation. The latency may be defined here as the time it takes to completely handle a packet. That is, the time it takes from the moment a packet is queued until the moment it is completely served.

FIGS. 8-10 show that the latency of the LC2WFQ scheduler is comparable to that of the WFQ scheduler. The DRR scheduler, however, seems to be biased to large packets, resulting in a large average latency and delay variation for small packets. FIGS. 11-13 show the simulation results when the scheduler 105 gets more traffic then the scheduler logic 105a can handle. In this particular situation, the LC2WFQ scheduler performs even better then the WFQ scheduler, indicating that the LC2WFQ scheduler provides desired fairness. FIGS. 11-13 also show that the DRR scheduler is no longer an alternative and that this type of scheduler can only be used when all input traffic is under policing control such that the total traffic entering the scheduler will never exceed the output service rate.

The simulations results in FIGS. 8-13 illustrate that in substantially all the cases, the LC2WFQ performs relatively better then the DRR scheduler, which is a scheduling discipline conventionally used in high-speed network devices. This may be so because the scheduling algorithm LC2WFQ uses the credit counters 145 to keep track of fairness, limits the credit counter boundaries between 0 and 2M with M as a threshold value in the case where M is the maximum size of a packet that potentially can arrive multiplied with the accuracy desired to specify the minimum bandwidth guarantee.

Furthermore, the scheduling algorithm LC2WFQ shown in Table 2 essentially updates all the credit counters 145 with the delta value in case one of them drops below the threshold value. By using the credit counter values minus the calculated front-end packet finish time (packet size/weight), the scheduling algorithm LC2WFQ determines the flow 135 to schedule next. The scheduling algorithm LC2WFQ shown in Table 2 updates the credit counter 145 of the flow 135 with the front-end packet 150 currently being served with a value that equals the packet size divided by a corresponding weight value.

Advantageously, in some embodiment of the present invention, the scheduling algorithm LC2WFQ shown in Tables 1 and 2 may provide characteristics that approach that of some known timestamp scheduler algorithms, such as the WFQ scheduler. Because of the simplicity of the scheduling algorithm LC2WFQ shown in Tables 1 and 2, implementation of the scheduler 105 becomes feasible in high-speed network devices operating at 1 gigabit and above, such as the network device 115. Since scheduling calculations may only be performed for outgoing packets, such as for the outgoing packet 132, the scheduler 105 reduces overall calculation complexity significantly as scheduling calculations may not be performed on every incoming packet. This substantially reduced calculation complexity in the scheduler 105 may offer advantages in terms of relatively less power dissipation and availability of relatively more time to determine the next packet to be served. With a minimum packet size of, e.g., 64 byte (Ethernet), ideally the scheduler 105 may provide 64 byte clock cycles (minus the overhead) to determine a flow 135 to schedule next.

In another embodiment of the present invention, a scheduling algorithm Easy, Fairness and Latency Optimized Weighted queuing algorithm (EZFLOW) described in more detail below may provide characteristics that approach that of some known timestamp scheduler algorithms, such as a Weighted Fair Queuing (WFQ) scheduler. This EZFLOW scheduling algorithm may provide a weighted fair queuing scheduling with low calculation complexity and fairness/delay bound characteristics comparable to many timestamp schedulers. The EZFLOW scheduling algorithm having characteristics compatible with the characteristics of a timestamp scheduler, e.g., WFQ but without the computational complexity of calculating timestamps and virtual time used to approximate the GPS model may offer many advantages in performance over the scheduling algorithm Low Calculation Complexity Weighted Fair Queuing (LC2WFQ) shown in Tables 1 and 2. In particular, the EZFLOW scheduling algorithm may adapt the performance of the scheduling algorithm LC2WFQ on at least one of the counts including complexity, fairness and latency by bounding the fairness by 2M and the latency by $L_i/w_i+L_{MAX}/R$. Likewise, the scheduler 105 based on the EZFLOW scheduling algorithm with a substantially reduced calculation complexity relative to timestamp schedulers, such as the WFQ scheduler may offer advantages in terms of relatively less power dissipation and availability of relatively more time to determine the next packet to be served.

Table 3 shows the EZFLOW scheduling algorithm in pseudo-code based on the scheduler logic 105a to implement the scheduler 105. The EZFLOW scheduling algorithm comprises three portions including an initialization portion, an en-queuing portion, and a de-queuing portion. In particular, an initialization process may be invoked by the EZFLOW scheduling algorithm when the scheduler 105 is first started and is used to set an activity counter (line 2) that tracks whether or not there are packets queued. Furthermore, in the initialization process, the scheduler 105 may set a per flow credit counter 145 (line 3-5).

Likewise, an en-queuing process may be invoked by the EZFLOW scheduling algorithm when a packet arrives in the network device 115, causing the scheduler 105 to serve a flow of outgoing packet stream. The EZFLOW scheduling algorithm may extract first a flow ID from the packet header (line 8). The flow ID is extracted by means of classification using a combination of packet header fields, e.g., a source address, a destination address, a virtual local area network (VLAN) tag, or an input port 122 the packet arrives upon. Using the queue 140 that corresponds to the extracted flow ID, the EZFLOW scheduling algorithm (line 9) may then en-queue the packet. Whenever a packet is queued, the activity counter may be incremented by one (line 10).

The EZFLOW scheduling algorithm may invoke a de-queuing process to check if there are flows 135 of outgoing packet stream that have packets waiting to be served (line 14). If there are packets queued, the scheduler 105 may determine an active flow that has the maximum credit value in the credit counter 145 after the service requested (line 15-27) is subtracted therefrom. When the EZFLOW scheduling algorithm determines the active flow with the maximum value is found the index and packet size will have a desired value. (line 23, 24). The next step is to actually send the front-end packet from the queue 140 with the corresponding index value (line 28).

During transmission of the selected packet, the EZFLOW scheduling algorithm may decrement the activity counter (line 29) and update the credit counter 145 of the corresponding flow 135 by subtracting the requested service (packet size/weight) at line 30. The next step is to update all the credit counters 145(1-N) (line 31-37) by adding the size of the packet currently being served when a flow has packets waiting (line 33) or else default to zero (line 35). The final step is to prevent the credit counters 145 (1-N) of continuously backlogged flows to head for negative infinite. To this end, the EZFLOW scheduling algorithm checks the credit counter 145 of the flow currently being served to determine whether it drops below −3M. If this is true then, a value M may be added to all flows that have a credit value lower then −2M (line 38-44).

TABLE 3

EZFLOW scheduling algorithm

```
1   Initialization
2         active = 0;
3         for (i = 0; i < flows; i = i + 1)
4             credit [i] = 0;
5         end for;
6
7   Enqueuing (invoked when packet p arrives)
8         k = extractFlowId(p);
9         enqueue (p, k);
```

TABLE 3-continued

EZFLOW scheduling algorithm

```
10          active = active + 1;
11
12   Dequeuing
13       while (true)
14           wait for (active > 0);
15           s1 = -3M;
16           s2 = -3M;
17           for (i = 0; i < flows; i = i + 1)
18               if ( notEmpty (queue[i]) ) then
19                   size = getSize(head(queue[i]));
20                   s1 = MAX (s1, (credit[i] - size/weight[i]));
21                   if (s1 > s2) then
22                       s2 = s1;
23                       packet_size = size;
24                       index=i;
25                   end if;
26               end if;
27           end for;
28           send (dequeue(queue[index]));
29           active = active - 1;
30           credit[index] = credit[index] - packet_size/weight[index];
31           for (i = 0; i < flows; i = i + 1)
32               if ( notEmpty (queue[i]) ) then
33                   credit[i] = credit[i] + packet_size;
34               else
35                   credit[i] = 0;
36               end if;
37           end for;
38           if (credit[index] < -3M ) then
39               for (i = 0; i < flows; i = i + 1)
40                   if ( credit[i] < -2M ) then
41                       credit [i] = credit [i] + M;
42                   end if;
43               end for;
44           end if;
45       end while;
```

The EZFLOW scheduling algorithm based on the scheduler logic 105a, as shown in Table 3, may be implemented in hardware or software or firmware or combination thereof. To keep track of fairness, the EZFLOW scheduling algorithm may use the credit counters 145(1-N) while still presetting all the credit counters 145(1-N) to zero at server start-up. The EZFLOW scheduling algorithm may calculate per backlogged flow by subtracting the front-end packet size divided by the weight from the credit counter value for scheduling the front-end packet of the backlogged flow with the highest calculated value. The EZFLOW scheduling algorithm may update the credit value of the flow just being serviced to the corresponding calculated value when still backlogged or reset this value to zero when idle.

As set forth in Table 3, the EZFLOW scheduling algorithm may increase the credit values of all backlogged flows with the size of the packet just being serviced. However, the EZFLOW scheduling algorithm may limit the credit counter lower boundaries by adding M to all credit counters 145(1-N) with values between -2M and -3M once a credit counter crosses the -3M threshold, wherein M is the maximum size of a packet that may potentially arrive divided by the lowest possible weight>0. In this way, the EZFLOW scheduling algorithm may provide relaxation of time constraints, i.e., the time to determine a particular flow to schedule next may be limited by the minimum packet size to be supported. Conversely, less calculation time may offer support for smaller packets or higher bit rates.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention set forth above is described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

While the invention has been illustrated herein as being useful in a telecommunications network environment, it also has application in other connected environments. For example, two or more of the devices described above may be coupled together via device-to-device connections, such as by hard cabling, radio frequency signals (e.g., 802.11(a), 802.11(b), 802.11(g), Bluetooth, or the like), infrared coupling, telephone lines and modems, or the like. The present invention may have application in any environment where two or more users are interconnected and capable of communicating with one another.

Those skilled in the art will appreciate that the various system layers, routines, or modules illustrated in the various embodiments herein may be executable control units. The control units may include a microprocessor, a microcontroller, a digital signal processor, a processor card (including one or more microprocessors or controllers), or other control or computing devices as well as executable instructions contained within one or more storage devices. The storage devices may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions, when executed by a respective control unit, causes the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

We claim:

1. A method for scheduling a plurality of backlogged flows of incoming packet traffic at a network device associated with a data network, each of the backlogged flows having an associated credit counter maintained that the network device, the method comprising:

scheduling, at the network device, an outgoing packet from the backlogged flow that has the largest value of its associated credit counter;

transmitting, from the network device, the outgoing packet from the backlogged flow that has the largest value of its associated credit counter;

decrementing the credit counter associated with the backlogged flow that has the largest value of its associated credit counter by an amount substantially equal to a size of the outgoing packet multiplied by a weighting factor; and maintaining values of the credit counters associated with the other backlogged flows.

2. The method of claim 1, wherein the weighting factor is equal to unity and wherein decrementing the credit counter comprises decrementing the credit counter by an amount equal to a size of the outgoing packet.

3. The method of claim 1, comprising determining the weighting factor based on a ratio of a rate assigned to the backlogged flow and a total bandwidth of an output link used to transmit the outgoing packets from the network device.

4. The method of claim 1, comprising initializing, at the network device, the credit counters associated with the backlogged flows to a value equal to a maximum packet size of the packets arriving at the network device.

5. The method of claim 4, comprising determining whether the value of the credit counter of the scheduled backlogged flow drops below a threshold value after being decremented.

6. The method of claim 5, comprising incrementing the values of the credit counters of the backlogged flows by a value equal to the maximum packet size of the packets arriving at the network device when the value of the credit counter of the scheduled backlogged flow drops below the threshold value after being decremented.

7. The method of claim 6, comprising determining whether the value of any credit counters exceed a maximum credit counter value and setting the value of the credit counters that exceed the maximum credit counter value to the maximum credit counter value.

* * * * *